United States Patent
Kicanaoglu et al.

(10) Patent No.: US 11,080,886 B2
(45) Date of Patent: Aug. 3, 2021

(54) LEARNING DISENTANGLED INVARIANT REPRESENTATIONS FOR ONE SHOT INSTANCE RECOGNITION

(71) Applicant: QUALCOMM INCORPORATED, San Diego, CA (US)

(72) Inventors: Berkay Kicanaoglu, Amsterdam (NL); Ran Tao, Amsterdam (NL); Arnold Smeulders, Amsterdam (NL)

(73) Assignee: Qualcomm Incorporated, San Diego, CA (US)

( * ) Notice: Subject to any disclaimer, the term of this patent is extended or adjusted under 35 U.S.C. 154(b) by 133 days.

(21) Appl. No.: 16/192,709

(22) Filed: Nov. 15, 2018

(65) Prior Publication Data
US 2019/0147234 A1    May 16, 2019

Related U.S. Application Data

(60) Provisional application No. 62/586,674, filed on Nov. 15, 2017.

(51) Int. Cl.
*G06T 7/73* (2017.01)
*G06K 9/00* (2006.01)
(Continued)

(52) U.S. Cl.
CPC ............ *G06T 7/74* (2017.01); *G06K 9/00214* (2013.01); *G06K 9/00342* (2013.01);
(Continued)

(58) Field of Classification Search
CPC ......... G06K 9/6255; G06T 7/564; G06T 7/74; G06T 19/006; G06T 2207/10012; G06T 2207/30236; G06F 17/30
(Continued)

(56) References Cited

U.S. PATENT DOCUMENTS

| 4,658,428 A | * | 4/1987 | Bedros | .................. G06T 3/0006 382/216 |
| 5,414,474 A | * | 5/1995 | Kamada | .................. G06T 7/246 348/135 |

(Continued)

OTHER PUBLICATIONS

Lotter (William Lotter, Unsupervised Learning of Visual Structure Using Predictive Generative Networks, Harvard University, arXiv:1511.06380v2, Jan. 20, 2016). (Year: 2016).*

(Continued)

*Primary Examiner* — Mark Roz
(74) *Attorney, Agent, or Firm* — Seyfarth Shaw LLP

(57) ABSTRACT

A method of one shot joint instance and pose recognition in an artificial neural network is presented. The method includes receiving a reference instance of a reference object from a reference image. The reference object has a first identity and a first pose in the reference instance. The method also includes generating a first orbit of the reference object comprising multiple additional poses including a second pose for the reference object. The method further includes recognizing a second instance of an example object from an example image. The example object has the first identity and the second pose in the second instance. The method still further includes recognizing the second pose and first identity of the example object based on comparing the first orbit with a second orbit of the example object.

30 Claims, 18 Drawing Sheets

(51) Int. Cl.
    *G06N 3/08*    (2006.01)
    *G06K 9/46*    (2006.01)
(52) U.S. Cl.
    CPC ............ *G06K 9/4628* (2013.01); *G06N 3/08* (2013.01); *G06K 9/00805* (2013.01)
(58) Field of Classification Search
    USPC ........................................................ 382/159
    See application file for complete search history.

(56) References Cited

U.S. PATENT DOCUMENTS 8,830,229 B2    9/2014   Drost et al.
9,158,988 B2    10/2015  Patel et al.

OTHER PUBLICATIONS

Guan P., et al., "Estimating Human Shape and Pose from a Single Image," IEEE 12th International Conference on Computer Vision, 2009, 8 Pages.
Pavlakos G., et al., "6-DoF Object Pose from Semantic Keypoints," IEEE International Conference on Robotics and Automation, Sep. 15, 2016, 8 Pages.
Savarese S., et al., "Multi-view Object Categorization and Pose Estimation," Chapter 8, Computer Vision, Springer Link, pp. 205-231.
Koch G., et al., "Siamese Neural Networks for One-shot Image Recognition", 2015, 8 pages.

* cited by examiner

LEARNING DISENTANGLED INVARIANT REPRESENTATIONS FOR ONE SHOT INSTANCE RECOGNITION

CROSS-REFERENCE TO RELATED APPLICATION

The present application claims the benefit of U.S. Provisional Patent Application No. 62/586,674 filed on Nov. 15, 2017, and titled "LEARNING DISENTANGLED INVARIANT REPRESENTATIONS FOR ONE-SHOT INSTANCE RECOGNITION" the disclosure of which is expressly incorporated by reference herein in its entirety.

BACKGROUND

Field

Certain aspects of the present disclosure generally relate to machine learning and, more particularly, to improving systems and methods of object recognition.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

In real world scenarios, it is desirable to recognize both the identity of an object and the object's pose (e.g., orientation). For example, in robotics, to interact with objects in an environment, a robot recognizes objects in the environment and their respective poses. In this example, for the robot to grab a chair, the robot recognizes both the chair and the chair's pose. As another example, in autonomous driving, the autonomous driving may be improved by identifying other cars on the road and determining the pose of the identified cars. In this example, accidents may be avoided by determining whether other cars are coming towards the autonomous vehicle or going away from the autonomous vehicle.

For object recognition systems, it is desirable for the system to recognize all possible appearance variations of the object. Pose recognition may be improved by using an invariant representation that captures the intrinsic identity property of the object. Aspects of the present disclosure are directed to improved methods and systems for determining the pose and identity of an object in an input based on a single image of an object in a reference input without additional sensory information.

SUMMARY

In one aspect of the present disclosure, a method for one shot joint instance and pose recognition in an artificial neural network is disclosed. The method includes receiving a first instance of a reference object from a reference image. The reference object has a first identity and a first pose in the first instance. The method also includes generating a first orbit of the reference object comprising multiple additional poses including a second pose for the reference object. The method further includes recognizing a second instance of an example object from an example image. The example object has the first identity and the second pose in the second instance. The method still further includes recognizing the second pose and first identity of the example object based on comparing the first orbit with a second orbit of the example object.

Another aspect of the present disclosure is directed to an apparatus including means for receiving a first instance of a reference object from a reference image. The reference object has a first identity and a first pose in the first instance. The apparatus also includes means for generating a first orbit of the reference object comprising multiple additional poses including a second pose for the reference object. The apparatus further includes means for recognizing a second instance of an example object from an example image. The example object has the first identity and the second pose in the second instance. The apparatus still further includes means for recognizing the second pose and first identity of the example object based on comparing the first orbit with a second orbit of the example object.

In another aspect of the present disclosure, a non-transitory computer-readable medium with non-transitory program code recorded thereon is disclosed. The program code is for one shot joint instance and pose recognition in an artificial neural network. The program code is executed by a processor and includes program code to receive a first instance of a reference object from a reference image. The reference object has a first identity and a first pose in the first instance. The program code also includes program code to generate a first orbit of the reference object comprising multiple additional poses including a second pose for the reference object. The program code further includes program code to recognize a second instance of an example object from an example image. The example object has the first identity and the second pose in the second instance. The program code still further includes program code to recognize the second pose and first identity of the example object based on comparing the first orbit with a second orbit of the example object.

Another aspect of the present disclosure is directed to an apparatus for one shot joint instance and pose recognition in an artificial neural network. The apparatus has a memory and one or more processors coupled to the memory. The processor(s) is configured to receive a first instance of a reference object from a reference image. The reference object has a first identity and a first pose in the first instance. The processor(s) is also configured to generate a first orbit of the reference object comprising multiple additional poses including a second pose for the reference object. The processor(s) is further configured to recognize a second instance of an example object from an example image. The example object has the first identity and the second pose in the second instance. The processor(s) is still further configured to recognize the second pose and first identity of the example object based on comparing the first orbit with a second orbit of the example object.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
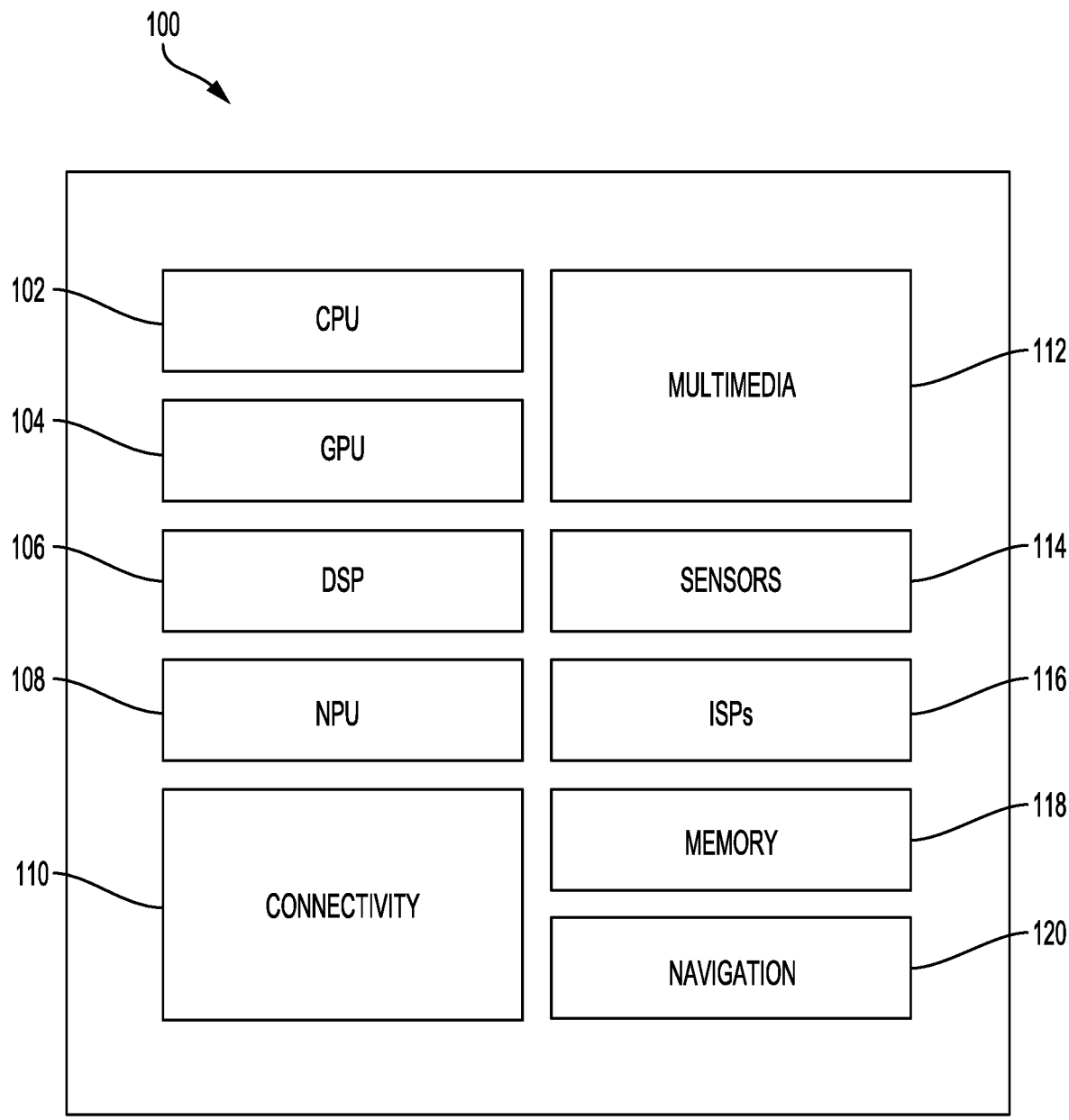
FIG. 1 illustrates an example implementation of designing a neural network using a system-on-a-chip (SOC), including a general-purpose processor, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Pose estimation has been addressed as both a continuous and a discrete problem. Conventional pose estimation systems use a large set of view-based object part detectors and classifiers, thereby reducing system performance. For example, some conventional pose estimation systems use three-dimensional (3D) computer aided design (CAD) models, explicitly or implicitly, to tackle a 3D pose estimation problem. For example, partial and/or whole object appearances may be rendered from CAD data for training. As another example, CAD models with semantic part annotation may learn 3D shape models, which are then used to estimate pose. More recently, conventional pose estimation systems leverage a large amount of 3D models to render a large-scale synthetic dataset to train a convolutional neural network (CNN). Aspects of the present disclosure use 3D models to learn a generator function in feature space. As such, aspects of the present disclosure do not use view-based object part detectors.

The use of one shot learning has recently increased for object detection. Conventional systems perform one shot learning using Bayesian transfer learning, metric learning, a Siamese CNN architecture, or augmentation of a single neural network with a memory module. Aspects of the present disclosure structure a deep neural network to capture pose variation. Additionally, the deep neural network may predict novel views without enforcing discriminative objectives on the optimization. As a result, cross-view comparisons in a one shot multi-view identity recognition setting are improved.

Joint pose and instance recognition may be used in various systems, such as a computer vision system (e.g., object recognition system). For example, when following people in a crowd, the computer vision system may identify a person ("who is this person?") and the person's pose ("which direction are they facing?"). In another example, an autonomous vehicle may use joint pose and instance recognition to anticipate a direction of another object, such as another vehicle. The anticipated direction may be used to follow an object, avoid an object, count how many objects are traveling in a specific direction, and/or predict the object's intent.

For example, when the same object is observed over time, the pose, regardless of subtleties, may be the only factor that provides an object's intent. As an example, when tracking a shopper through a store, the shopper's intent (e.g., shopping or shoplifting) may only be reconstructed from the shopper's pose over time. In this example, if the shopper turns away from store workers, the shopper may have an intent to shoplift rather than shop. Aspects of the present disclosure are directed to object recognition systems that recognize both the identity and the pose of a sample (e.g., image) obtained from an input.

In machine learning, it is desirable to use a single image for various tasks. By using a single image, machine learning systems reduce the amount of data used, thereby reducing the use of system resources (e.g., memory and processor load). Furthermore, a 3D-rotation generated by two or more images may cause self-occlusions. Therefore, comparing two instances based only on an arbitrary pose may cause inaccuracies. For example, when two cars point in opposite directions, cues to determine the pose orientation may be off by one-hundred eighty degrees due to the front-back symmetry of some cars. As another example, for cars with the same color, erroneous identification of the pose may lead to a mistaken identity. Furthermore, the geometries of the cars may not be directly comparable. In another example, a lost identity of a person in a crowd leads to loss of pose.

Although pose and identity recognition are related, conventional object recognition systems track pose and identity individually rather than jointly. Conventional object recognition systems cannot handle the increased number of parameters caused by joint tracking. That is, in conventional object recognition systems, joint modeling results in increased complexity, increased memory load, and/or overfitting (e.g., an over trained neural network). Aspects of the present disclosure are also directed to improving joint modelling.

In one configuration, to reduce a number of used resources, a single parametrization is used for both tasks. Joint pose and identity recognition may be tasked as a one shot learning problem. That is, a learning function is trained to identify both pose and identity from one shot (e.g., one image) of a known category based on E-invariant structures (e.g., orbits). Orbits describe an ordered set of observations for an instance undergoing a group transformation. Examples of relevant transformations are out-of-plane rotation, in-plane rotation, and change in illumination direction. Although the same function applies to many transformation groups, aspects of the present disclosure are directed to an out-of-plane rotation group with a single parameter. Still, aspects of the present disclosure are not limited to an out-of-plane rotation group with a single parameter, as other relevant transformations are also contemplated.

A learning function generates the orbit of an instance in a deep representational space. The deep representational space may be a deep representation (e.g., feature) at an arbitrary layer of a convolutional neural network (e.g., machine learning system). An orbit metric compares the generated orbit with the orbits of other instances. The orbit metric may be defined to measure the visual similarity and azimuthal difference between two instances given by their two-dimensional (2D) views with arbitrary pose differences between them. While measuring the similarity in visual identity, combinations of hallucinated pose views are taken into account to arrive at a closest estimate of similarity.

A two-branch convolutional network architecture may be used to learn an interpretable representation for orbits in an encoder-decoder fashion. The neural network may be referred to as the orbit generator. Parameter reduction and reduced model complexity may be achieved by using the same network at bottom layers while applying disentanglement at upper layers between identity and pose estimation. In the high-dimensional feature space, the encoding of a pose is disentangled from identity-related information. Disentanglement begins from unit separation in the upper layers, and is improved by a unit swap operation.

The orbit generator may be trained on view-annotated datasets. Currently, multi-view datasets are not readily available, thus, 3D models may be used to train the orbit generator. 3D models provide geometrical details with known labels for the viewing direction. According to aspects of the present disclosure, by using synthetically generated data, a model may approximate the orbit from the geometries of the instances as plotted in feature space. Of course, real world data may be used in addition to, or alternate from, the synthetically generated data. Aspects of the present disclosure are also not limited to identity and pose. Other factors may also be considered, such as identity and illumination direction, identity and scale, or any other transformation group.

As an example, a class of instances is documented with a variety of samples for each instance in the class (e.g., training set $D_{train}$). Furthermore, one or more new instances (e.g., reference set $D_{ref}$) may be obtained from an image, where each instance is obtained from a single image. The training set $D_{train}$ and the reference set $D_{ref}$ are two disjoint sets of images depicting completely different sets of objects, such as cars. The machine learning system may learn the generator from the training set $D_{train}$ and test on never-seen objects of the reference set $D_{ref}$. The reference set $D_{ref}$ may also be referred to as a one shot reference set $D_{ref}$.

Given the one or more instances in the reference set $D_{ref}$, a machine learning system may be tasked with recognizing a pose and identity of each instance (e.g., test image) in the reference set $D_{ref}$. The reference set $D_{ref}$ may be constrained to contain a single arbitrary view (e.g., one shot) from each novel object class in the reference set $D_{ref}$. As such, in some cases, an instance may have a different pose from the pose of the instance(s) in the reference set $D_{ref}$. That is, at test time, an object, such as a car belonging to a car class, obtained from an image may be positioned in a different orientation, with respect to the camera, in comparison to the available example of the object from the car class in the reference set $D_{ref}$.

In one configuration, given the one reference image in the reference set $D_{ref}$ and/or an unknown test image x, multiple images with different poses are hallucinated (e.g., generated). That is, an orbit may be generated with the pose as the varying parameter. In one configuration, the orbit refers to a collection of feature points of an object when submitted to a transformation. The feature points may be ordered by a parameter (e.g., angle) capturing the source of the variation.

In one configuration, feature vectors f are hallucinated to describe each view rather than the view itself. The collection of feature vectors of an object x may be referred to as the orbit $O_x=\{f_j^x|j=1, 2, \ldots, N\}$, where x represents the object (e.g., object identity), j is the index of the elements of the orbit, and N is the total number of elements of the orbit. In one configuration, an orbit generator is learned from the training set $D_{train}$. The orbit generator may generate the orbit of an object given a single view (e.g., image) of the object. For example, the orbit generator learns how to generate an orbit from M instances from the same class (e.g., chair). In this example, each of the M instances has multiple views. The orbit generator may be modeled by formulating orbit generation as walking on the manifold in the feature space with pose as the varying parameter.

The pose and identity of an object may be recognized in a reference input based on a single instance of the object in the reference input (e.g., reference image) without additional sensory information. In one configuration, the object recognition system is trained using two training examples that include one or more synthetic training examples and/or one or more real training examples. That is, in one configuration, the object recognition system learns two representations within a single model that explicitly separates pose information and identity information, and models the interaction of the pose information and the identity information.

According to aspects of the present disclosure, to improve object recognition, an object recognition system extracts identity representations and pose representations by disentangling the object's identity information from the object's pose. The identity representation is used for object identity recognition and the pose representation is used for pose estimation. In one configuration, one training example for each class is used to train an object recognition system. For example, one car training example may be used to train the object recognition system to perform pose and identity recognition for all types of cars within the car class. As a result of using one training example, a speed of training may be increased by training a system (e.g., robot, autonomous vehicle, drone, etc.) to recognize both objects and poses. The increased speed of training may allow systems that use object recognition to operate in new environments without additional training time. The training example refers to the only available example, for each class, in the reference set $D_{ref}$.

FIG. 1 illustrates an example implementation of a system-on-a-chip (SOC) 100, which may include a central processing unit (CPU) 102 or a multi-core CPU configured to learn disentangled invariant representations for one shot instance recognition in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to receive a first instance of a reference object from a reference image, the reference object having a first identity and a first pose in the first instance. The instructions loaded into the general-purpose processor 102 may also comprise code to generate a first orbit of the reference object comprising a plurality of additional poses including a second pose for the reference object. The instructions loaded into the general-purpose processor 102 may further comprise code to recognize a second instance of an example object from an example image, the example object having the first identity and the second pose in the second instance. The instructions loaded into the general-purpose processor 102 may also comprise code to recognize the second pose and the first identity of the example object based on comparing the first orbit with a second orbit of the example object.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
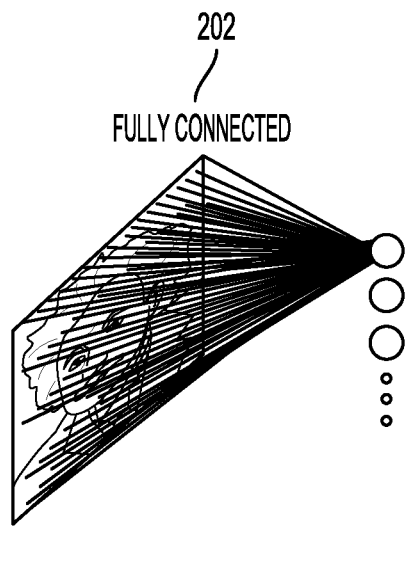
FIGS. 2A, 2B, and 2C are diagrams illustrating a neural network in accordance with aspects of the present disclosure.
Figure 2B:
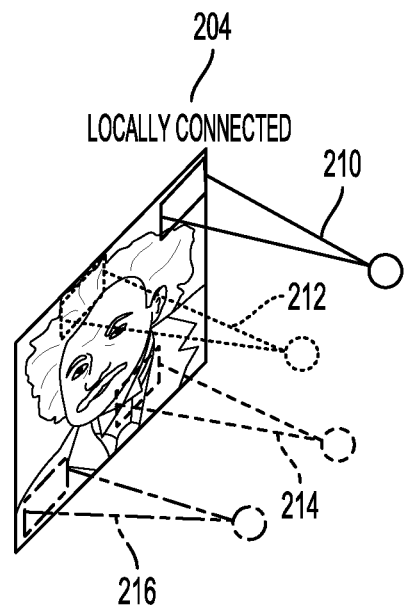

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
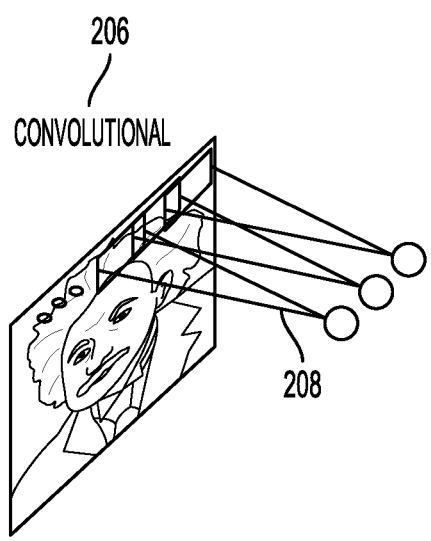

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 3:
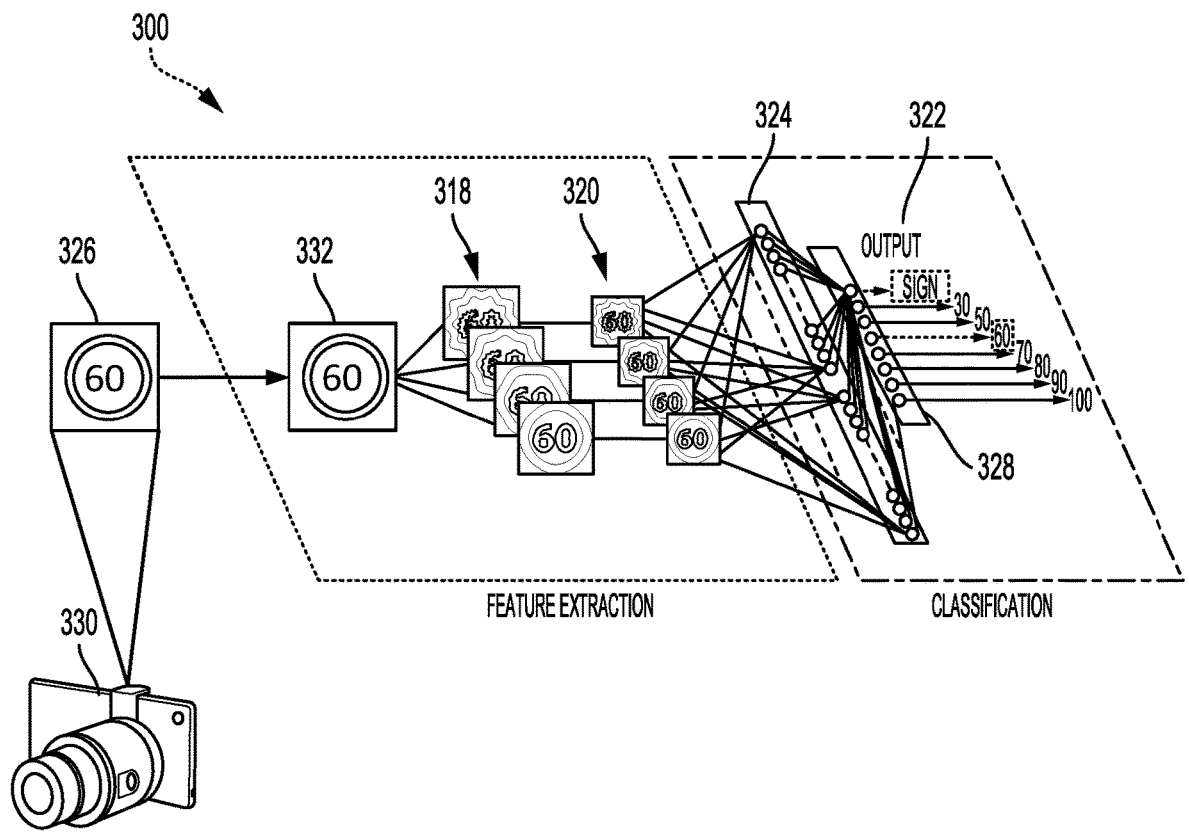
FIG. 3 is a diagram illustrating an exemplary deep convolutional network (DCN) in accordance with aspects of the present disclosure.

One type of convolutional neural network is a deep convolutional network (DCN). FIG. 3 illustrates a detailed example of a DCN 300 designed to recognize visual features from an image 326 input from an image capturing device 330, such as a car-mounted camera. The DCN 300 of the current example may be trained to identify traffic signs and a number provided on the traffic sign. Of course, the DCN 300 may be trained for other tasks, such as identifying lane markings or identifying traffic lights.

The DCN 300 may be trained with supervised learning. During training, the DCN 300 may be presented with an image, such as the image 326 of a speed limit sign, and a forward pass may then be computed to produce an output 322. The DCN 300 may include a feature extraction section and a classification section. Upon receiving the image 326, a convolutional layer 332 may apply convolutional kernels (not shown) to the image 326 to generate a first set of feature maps 318. As an example, the convolutional kernel for the convolutional layer 332 may be a 5×5 kernel that generates 28×28 feature maps. In the present example, because four different feature maps are generated in the first set of feature maps 318, four different convolutional kernels were applied to the image 326 at the convolutional layer 332. The convolutional kernels may also be referred to as filters or convolutional filters.

The first set of feature maps 318 may be subsampled by a max pooling layer (not shown) to generate a second set of feature maps 320. The max pooling layer reduces the size of the first set of feature maps 318. That is, a size of the second set of feature maps 320, such as 14×14, is less than the size of the first set of feature maps 318, such as 28×28. The reduced size provides similar information to a subsequent layer while reducing memory consumption. The second set of feature maps 320 may be further convolved via one or more subsequent convolutional layers (not shown) to generate one or more subsequent sets of feature maps (not shown).

In the example of FIG. 3, the second set of feature maps 320 is convolved to generate a first feature vector 324. Furthermore, the first feature vector 324 is further convolved to generate a second feature vector 328. Each feature of the second feature vector 328 may include a number that corresponds to a possible feature of the image 326, such as "sign," "60," and "100." A softmax function (not shown) may convert the numbers in the second feature vector 328 to a probability. As such, an output 322 of the DCN 300 is a probability of the image 326 including one or more features.

In the present example, the probabilities in the output 322 for "sign" and "60" are higher than the probabilities of the others of the output 322, such as "30," "40," "50," "70," "80," "90," and "100". Before training, the output 322 produced by the DCN 300 is likely to be incorrect. Thus, an error may be calculated between the output 322 and a target output. The target output is the ground truth of the image 326 (e.g., "sign" and "60"). The weights of the DCN 300 may then be adjusted so the output 322 of the DCN 300 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 326) and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 320) receiving input from a range of neurons in the previous layer (e.g., feature maps 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 4:
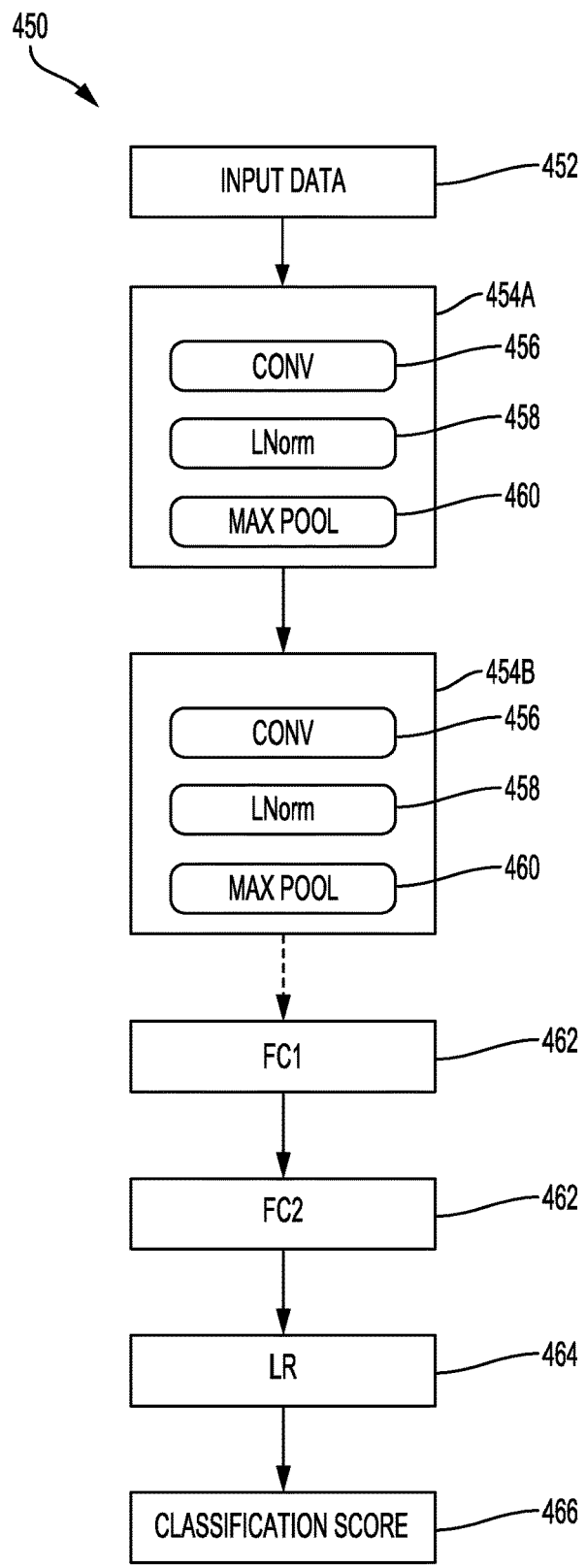
FIG. 4 is a block diagram illustrating an exemplary deep convolutional network (DCN) in accordance with aspects of the present disclosure.

FIG. 4 is a block diagram illustrating a deep convolutional network 450. The deep convolutional network 450 may include multiple different types of layers based on connectivity and weight sharing. As shown in FIG. 4, the deep convolutional network 450 includes the convolution blocks 454A, 454B. Each of the convolution blocks 454A, 454B may be configured with a convolution layer (CONV) 456, a normalization layer (LNorm) 458, and a max pooling layer (MAX POOL) 460.

The convolution layers 456 may include one or more convolutional filters, which may be applied to the input data to generate a feature map. Although only two of the convolution blocks 454A, 454B are shown, the present disclosure is not so limiting, and instead, any number of the convolution blocks 454A, 454B may be included in the deep convolutional network 450 according to design preference. The normalization layer 458 may normalize the output of the convolution filters. For example, the normalization layer 458 may provide whitening or lateral inhibition. The max pooling layer 460 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 450 may access other processing blocks that may be present on the SOC 100, such as sensor processor 114 and navigation module 120, dedicated, respectively, to sensors and navigation.

The deep convolutional network 450 may also include one or more fully connected layers 462 (FC1 and FC2). The deep convolutional network 450 may further include a logistic regression (LR) layer 464. Between each layer 456, 458, 460, 462, 464 of the deep convolutional network 450 are weights (not shown) that are to be updated. The output of each of the layers (e.g., 456, 458, 460, 462, 464) may serve as an input of a succeeding one of the layers (e.g., 456, 458, 460, 462, 464) in the deep convolutional network 450 to learn hierarchical feature representations from input data 452 (e.g., images, audio, video, sensor data and/or other input data) supplied at the first of the convolution blocks 454A. The output of the deep convolutional network 450 is a classification score 466 for the input data 452. The classification score 466 may be a set of probabilities, where each probability is the probability of the input data including a feature from a set of features.

In one configuration, a one shot object recognition model is configured for receiving a first instance of a reference object from a reference image. The one shot object recognition model is also configured for generating a first orbit of the reference object comprising additional poses, including a second pose for the reference object. The one shot object recognition model is further configured for recognizing a second instance of an example object from an example image. The example object has the first identity and the second pose in the second instance. The one shot object recognition model is still further configured for recognizing the second pose and first identity of the example object based on comparing the first orbit with a second orbit of the example object. The model includes a receiving means, generating means, and/or recognizing means. In one aspect, the receiving means, generating means, and/or recognizing means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Pose estimation has been addressed as both continuous and discrete problems. Conventional object recognition systems use a large set of view-based object part detectors and classifiers, thereby reducing system performance. Aspects of the present disclosure do not use view-based object part detectors.

Additionally, some conventional object recognition systems use 3D models, explicitly or implicitly, to address a 3D pose estimation problem. For example, part and whole-object appearances may be rendered from CAD data for training. As another example, CAD models with semantic part annotation may be used to learn 3D shape models, which may then be used to estimate pose. More recently, conventional object recognition systems leverage a large amount of 3D models to render a large scale synthetic dataset to train a convolutional neural network (CNN). Aspects of the present disclosure use 3D models to learn a generator function in feature space.

An object recognition system may be tasked with recognizing different instances of an object based on a single instance of the object. In the present disclosure, a single instance refers to one instance of an object in an input (e.g., image) rather than multiple instances of an object in an input. For example, if an image includes multiple cars, a single instance refers to one of the cars in the image. An instance also does not refer to an entire image sample. Rather, the instance is one object in the image sample. The single instance of the object in an input may have a pose that is different from the pose of the other instances of the object in other inputs. According to aspects of the present disclosure, an instance refers to a specific object, such as a specific type of car (e.g., two door convertible coupe), a specific car model, or a specific person (e.g., President Obama), and does not refer to all cars in general or all people in general.

In one example, for object recognition, a set of reference images may depict a set of M instances. For each of the reference images, it is known what instance is in the image. The task is to recognize which of the M instances matches the test image (e.g., example image) when a test image is presented to the system (e.g., artificial neural network). In one configuration, each of the M instances corresponds to one reference image, and it is desired to recognize both the identity and the pose of the test image. Therefore, the problem may be referred to as one shot joint instance and pose recognition.

That is, it is assumed that a model has access to a multi-view training set $D_{train}$ of M tuples ($D_{train}=\{(x^i,y^i,\theta^i)|i=1,\ldots,M\}$). Each tuple includes an image $x^i$ depicting an instance, a corresponding identity label $y^i \in Y$, and a driving pose parameter $\theta^i \in \Theta$. Y is the set of identity labels, and $\Theta$ is the set of pose labels. The training set has $N_{train}$ different instances, yielding $|Y|=N_{train}$. The continuous pose space may be partitioned over the unit circle into K discrete poses such that $$\theta^i \in \theta = \left\{k \cdot \Delta\theta \mid \Delta\theta = \frac{2\pi}{k}, k = 0, \ldots K-1\right\}.$$

It is also assumed the model has access to a separate reference set $D_{ref}$, including $M_{ref}$ images in total, one image for each of the $M_{ref}$ different instances. The instances in the reference set are novel, in that they do not appear in the training set $D_{train}$. A test set $D_{test}$, includes other views of the reference instances excluding the ones in the reference set $D_{ref}$. Aspects of the present disclosure generalize over novel instances and recognize the identity and pose of a given test image $x_{test} \in D_{test}$ by using the reference set $D_{ref}$. As there is only one image for each novel object in the reference set $D_{ref}$, the problem may be referred to as one shot joint instance and pose recognition.

For example, given a reference set (e.g., single-view dataset) $D_{ref}$ with $M_{ref}$ object instances that belong to the same category (e.g., car). The reference set $D_{ref}$ may also be referred to as a one shot reference set. Each of the $M_{ref}$ instances in the reference set $D_{ref}$ is associated with a single image $x_i$. That is, the reference set $D_{ref}$ is a collection of images $\{x_i|i=1, 2, \ldots, N_s\}$. Each image $x_i$ is associated with an identity label $y_i$ and a pose label $p_i$. Furthermore, $Y_s$ is the set of identity labels and $P_s$ is the set of pose labels in the one shot reference set $D_{ref}$.

Given a test image $x_{test}$, which depicts one of the $N_s$ instances in the one shot reference set $D_{ref}$, the artificial neural network is tasked with simultaneously recognizing the test image's $x_{test}$ identity label $y_t(y_t \in Y_s)$ and pose $p_t$. The images $x_i$ in the one shot reference set $D_{ref}$ are reference images, which are used to infer the identity label $y_t$ and the pose label $P_t$ of the test image $x_{test}$. The one shot reference set $D_{ref}$ includes one image for each instance. Therefore, aspects of the present disclosure perform joint instance and pose recognition based on one image (e.g., one shot joint instance and pose recognition).

According to aspects of the present disclosure, pose is characterized by one parameter (e.g., viewpoint angle). The viewpoint angle may be continuous. Thus, the pose space may also be continuous. The continuous space is discretized by uniformly sampling pose classes with Δk-degree intervals, resulting in N pose classes, denoted by P. In one configuration, $P_s \subseteq P$ and $p_t \in P$. In practice, images of the same instance may show different poses. Therefore, the test image and the reference image may differ in appearance even though they depict the same instance, thereby increasing the difficulty of instance recognition. Moreover, the images in the one shot reference set $D_{ref}$ may cover a limited repertoire of poses. Thus, the pose $p_t$ of the test image $x_{test}$ may not be in the set of pose labels $P_s$. For example, the instances $N_s$ of the images in the one shot reference set $D_{ref}$ may show the same pose, (e.g., $|P_s|=1$), while the instance of the test image $x_{test}$ may be in any pose.

Figure 5:
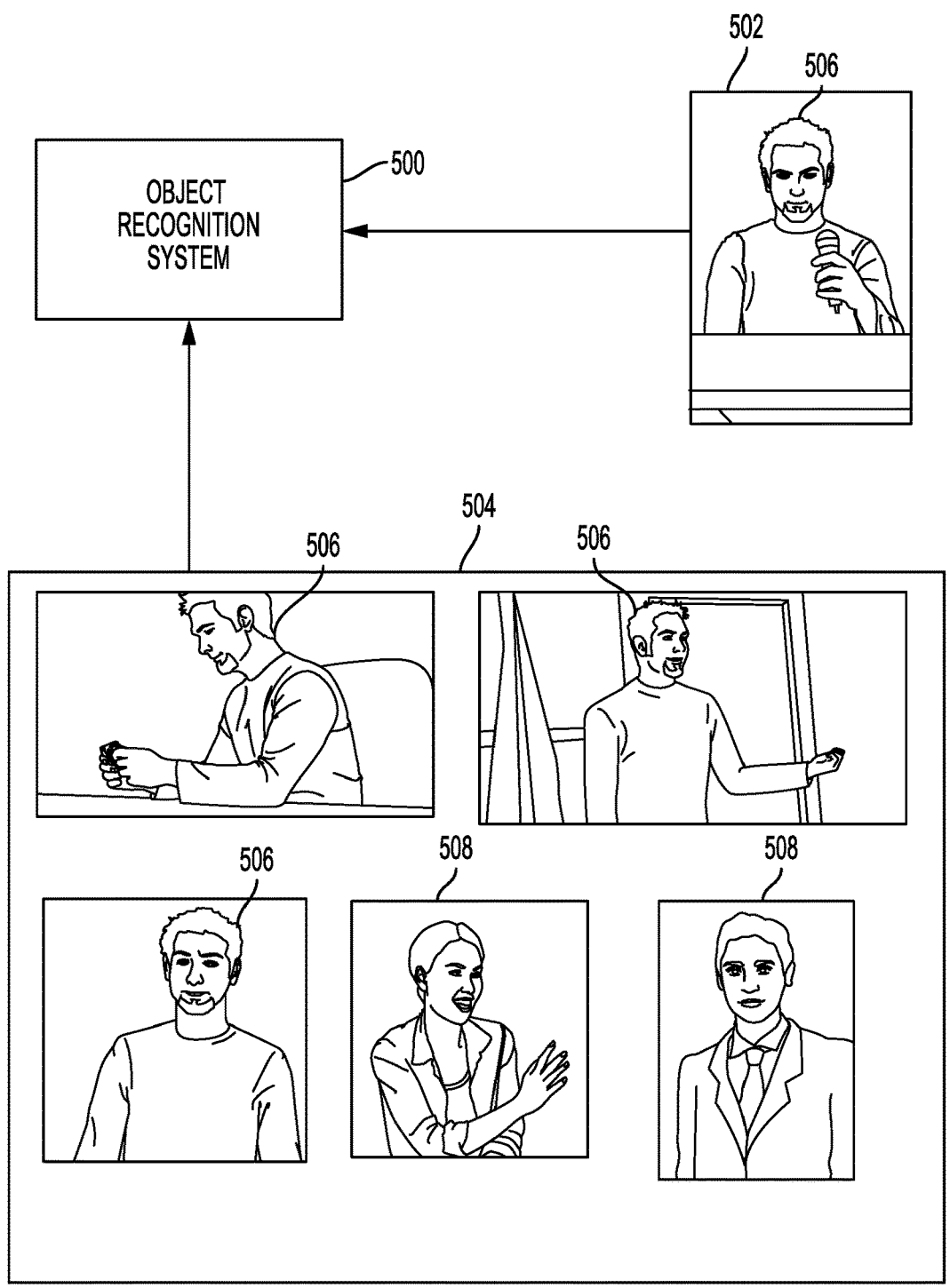
FIG. 5 illustrates an example of object recognition according to aspects of the present disclosure.

As an example, as shown in FIG. 5, an object recognition system 500 may receive a first input 502 (e.g., reference image). Based on the received input, the object recognition system 500 may be tasked with recognizing all other instances of an object 506 (e.g., man with a goatee) from a dataset 504 without having seen the different poses of the object. The dataset 504 may also be referred to as the one shot reference set $D_{ref}$. As shown in FIG. 5, the pose (e.g., orientation) of the object 506 in the dataset 504 is different from the pose of the object 506 in the first input 502. In one configuration, based on the single instance of the object 506 (e.g., man with a goatee facing the camera) in the first input 502, the object recognition system 500 recognizes different instances of the object 506 in different poses (e.g., different poses of the man with a goatee) from multiple different items in the dataset 504. Furthermore, other objects 508 do not have the same identity as the identity of the object 506 in the first input 502. Therefore, the other objects 508 are not recognized as the man with a goatee.

Figure 6:
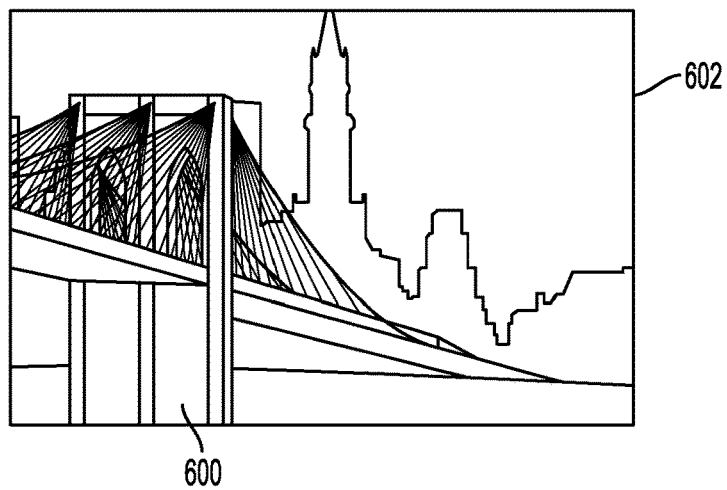
FIG. 6 illustrates examples of different instances of an object according to aspects of the present disclosure.
Figure 6:
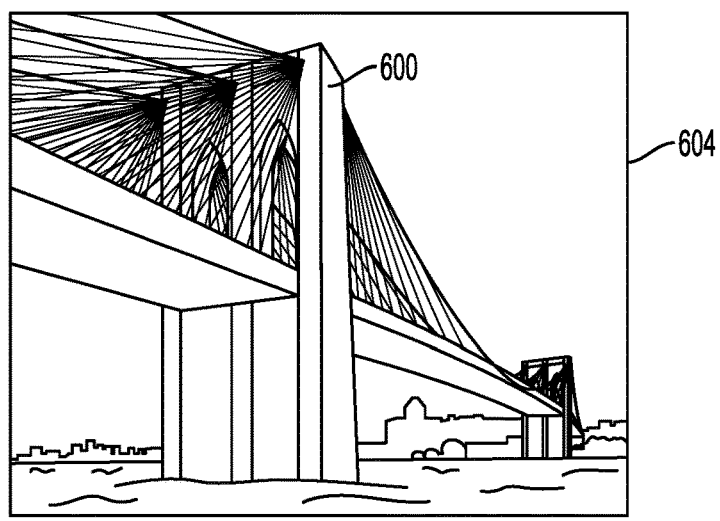
Figure 6:
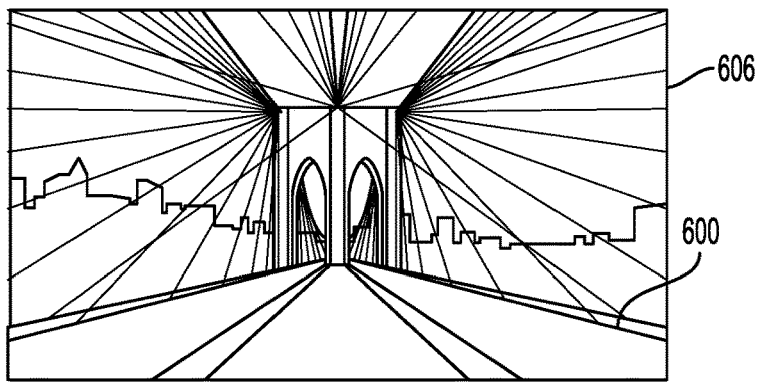

Visual features of an instance may vary in appearance in different inputs due to different factors, such as changes in illumination, pose, surface cover, self-deformation, occlusion, context, viewpoint, camera factors, and/or other factors. As an example, as shown in FIG. 6, visual features of a bridge 600 vary in the different images 602, 604, 606 based on factors such as illumination, pose, surface cover, self-deformation, occlusion, context, viewpoint, camera factors, and/or other factors. Aspects of the present disclosure are directed to recognizing instances of the bridge 600 in an input based on only a single instance of the bridge 600, such as the instance in image 602. Aspects of the present disclosure are not limited to recognizing instances of only different poses. The object recognition system is also contemplated to find instances with different factors (e.g., visual features) from the instance of the initial query, such as illumination, surface cover, self-deformation, occlusion, context, viewpoint, camera factors, and/or other factors.

Figure 7:
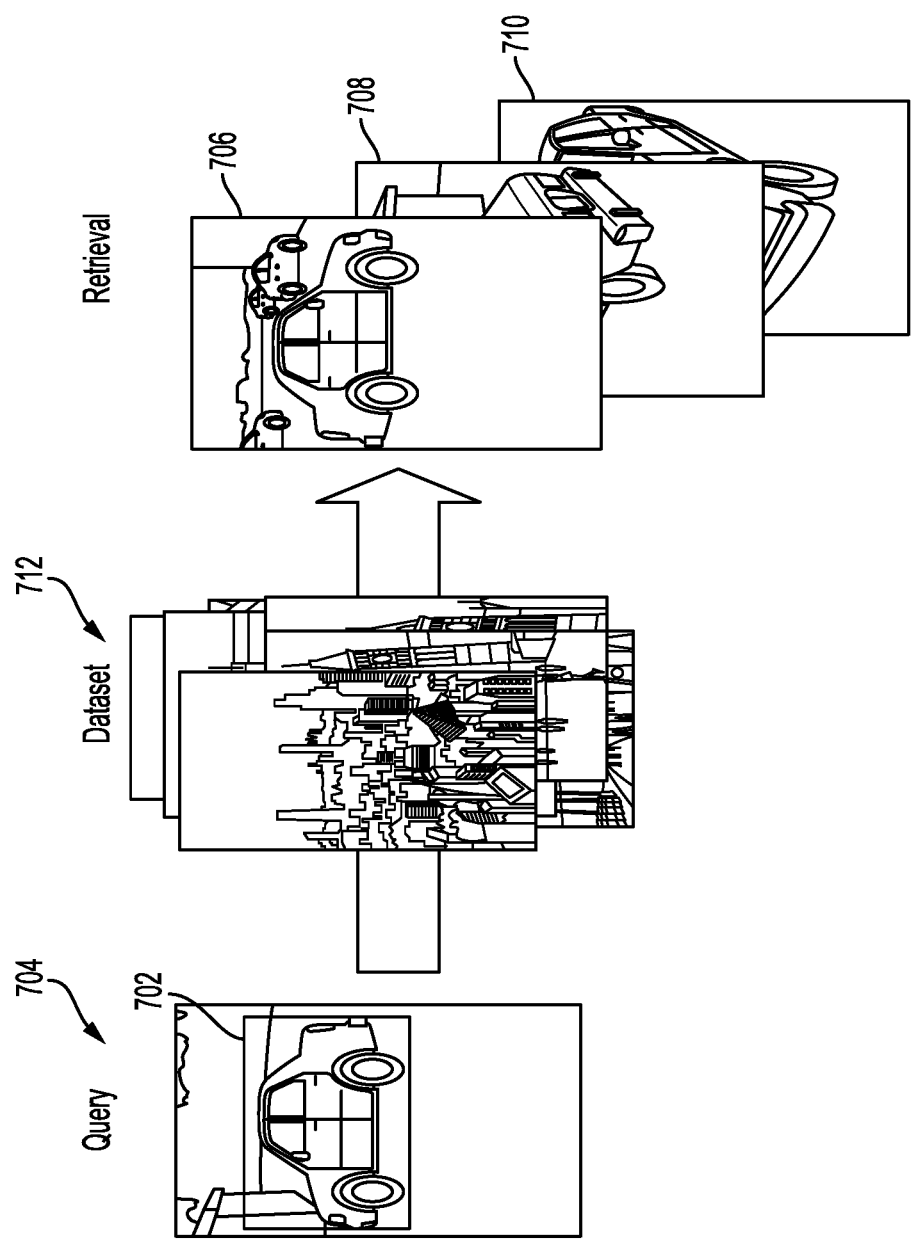
FIGS. 7, 8, 9, and 10 illustrate examples of object recognition according to aspects of the present disclosure.

FIG. 7 illustrates an example of recognizing instances 706, 708, 710 of an object 702 in a dataset 712 of different objects based on a received query 704 of the object 702. In the present example, as shown in FIG. 7, an object recognition system (not shown) may receive a query 704 to recognize all instances of the object 702 (e.g., blue four door car) from the dataset 712, which includes images of different objects. In the present example, only a single instance of the object 702 is provided in the query 704. The object recognition system recognizes instances 706, 708, 710 of the object 702 and recognizes the different poses based on the single image of the object 702 in the query 704.

Figure 8:
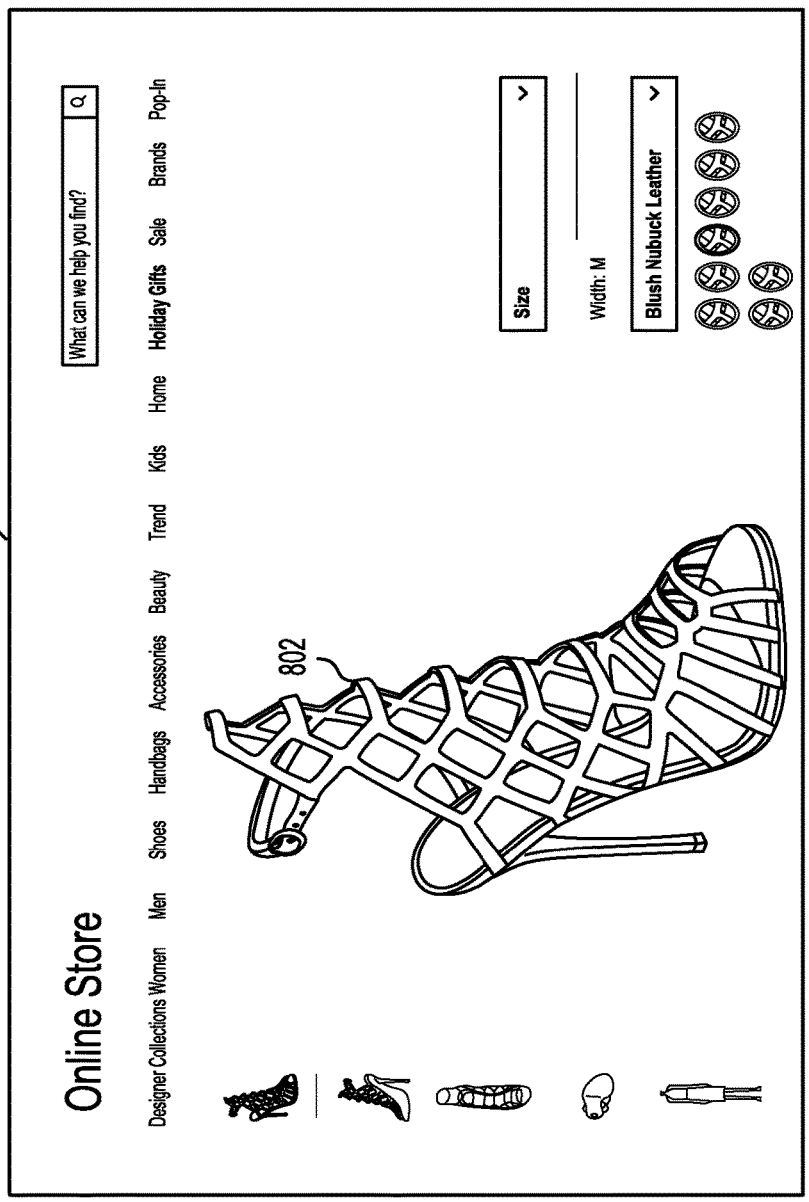
Figure 8:
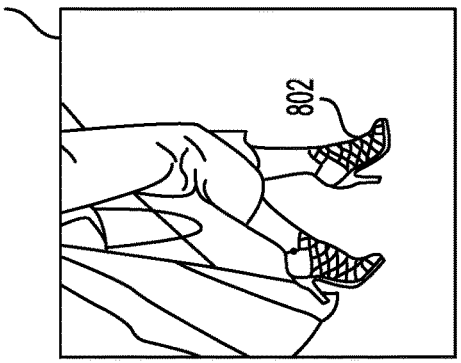
Figure 8:
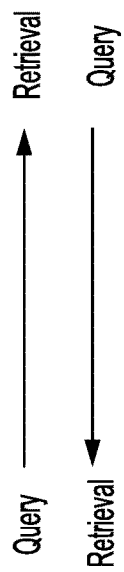

In another example, as shown in FIG. 8, an object recognition system may receive a query that includes an image of an object 802, such as an image of a shoe from an online shopping platform 806. The object recognition system may recognize one or more instances 804 of the object 802, such as an image of a person wearing the respective shoe, from a dataset. Alternatively, the query may include the instance 804 of the object 802 and the object recognition system may recognize instances of the object 802 in an online shopping platform 806. The object recognition system recognizes both the identity of the instance (e.g., shoe) and the pose of the instance based on the reference image in the query.

Figure 9:
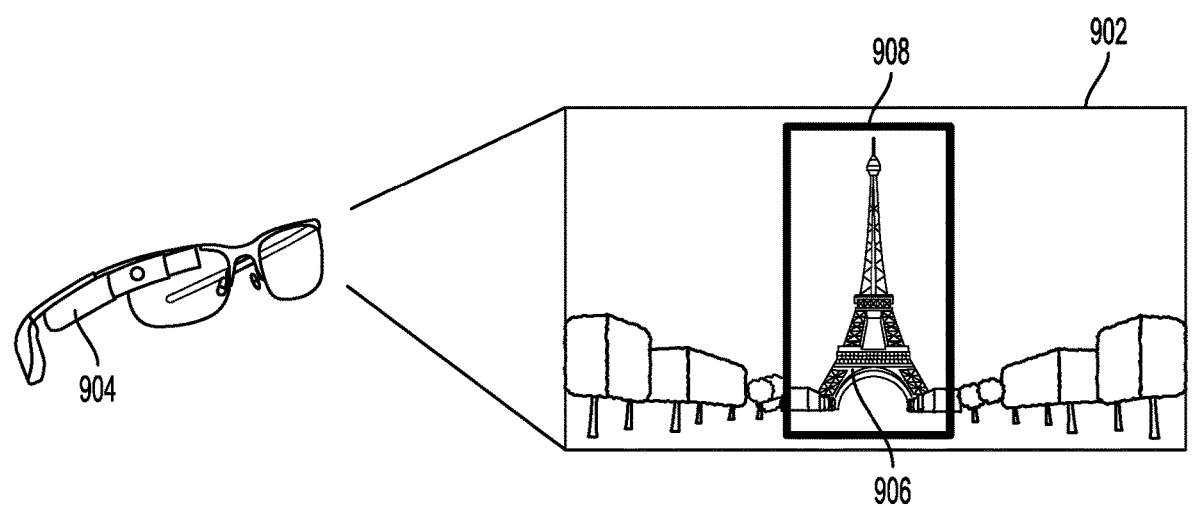

FIG. 9 illustrates an example of visual instances recognition, according to aspects of the present disclosure. As shown in FIG. 9, a user may view a scene 902 via an image capturing device 904, such as an optical head-mounted image capturing device. The image capturing device 904 may recognize instances of landmarks 906 (e.g., Eiffel Tower) in the scene 902, augment 908 (e.g., in a bounding box) the landmark 906, and/or self-localize (e.g., display a location, such as Paris, of the scene 902).

Figure 10:
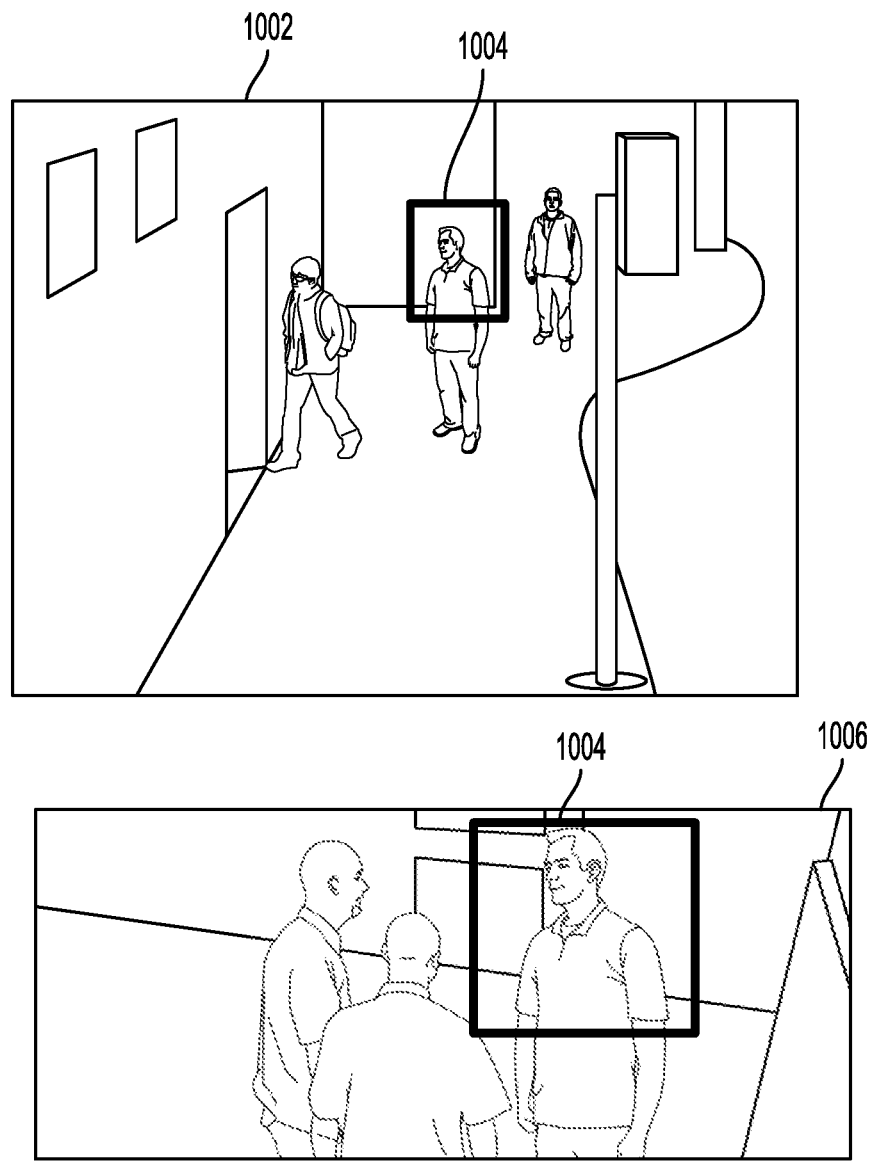

FIG. 10 illustrates another example of visual instances recognition, according to aspects of the present disclosure. As shown in FIG. 10, an object recognition system may receive an input 1002 of an instance of an object 1004, such as a suspected criminal, to search for other instances of the object 1004. In this example, the search may be performed to recognize other inputs 1006 of the instance of the object 1004 and also to identify the pose and identity of the instance of the object 1004.

One shot joint instance and pose recognition may be applicable to various scenarios. For example, one shot joint instance and pose recognition can be used for tracking objects, autonomous following of an object (e.g., following a car), counting based on the pose (e.g., counting the number of cars traveling in the same direction), and distinguishing different types of objects (e.g., distinguishing one smartphone brand from another smartphone brand).

In some cases, the identity of the object (e.g., subject) of the query is determined without knowing the pose. In one configuration, the pose of the subject is determined after determining the identity. Determining the pose may assist in collision avoidance. As an example, for autonomous vehicles, irrespective of identity, determining an object is heading towards the autonomous vehicle may prevent a collision with the object. Determining the pose may also assist in revealing the intent of the object. That is, when the identity of an object, such as a chef, is known, the intent of the object, such as the chef moving towards the stove to cook, may be determined based on the determined pose. As an object has only one identity, knowing the class of the identity reduces the search space for determining the pose, as only poses associated with the determined identity may be recognized.

An orbit of a reference image may be used to recognize a test image. According to invariant theory, an orbit is a collection of measurements of an object x undergoing a group transformation G. Orbits offer invariance against the underlying group transformations on a 2D plane, such as translation, scaling, and in-plane rotation. For non-group transformations, such as out-of-plane rotation on a 2D plane (projected from 3D), quasi-invariance with varying bounds may be obtained on invariance depending on the geometry of the object. Aspects of the present disclosure are directed to a group of 3D rotations in a 3D space, as it is desired to predict the 3D pose of an instance from a 2D image. The mode may focus on a subset of the group of 3D rotations, as shown in equation 1:

$$G = \left\{ e, g \mid e = g_K, g_k = \underbrace{g \cdot \ldots \cdot g \cdot \ldots \cdot g}_{k \text{ times}} \right\}. \quad (1)$$

In equation 1, e is the identity element, g is the generator, K is the parameter defining the discretization of pose space, and · is the group operation. The parameter g may be arbitrarily selected amongst many parameters depending on the purpose. In one configuration g is the rotation around the z-axis. In one example, the parameter g may be selected for the purpose of relative elevation estimation. As another example, the parameter g may be selected for the purpose of camera intrinsic estimation.

The orbit $X_g$ of a given sample x, may be represented as $X_g = \{e \cdot x, g_1 \cdot x, \ldots, g_{k-1} \cdot x\} \in \mathbb{X} = \mathbb{R}^3$, where the orbit $X_g$ is generated by $g \in G$. $\mathbb{X}$ represents a vector field and $\mathbb{R}$ represent a real number, where $\mathbb{X}$ may be a subset of $\mathbb{R}$. The elements of $X_g$ are ordered by the driving pose parameter. That is, the orbit is a list of views for each instance and the order of the elements of this list is determined by the rotation parameter. For example, the orbit might have images from the list of views given by [0°, 10°, 20°, 30°, ..., 340°, 350°].

It is desirable to generate a complete orbit, although discretized, given a single shot of an instance in an arbitrary pose. To that end, an orbit generator model is used. The orbit generator model may infer the initial pose of the given single shot and approximate the transformation in pose space to generate consecutive pose representations, while allowing for discrimination as used by an identity recognition task. Pose information may be disentangled from other nuisance factors irrelevant to pose prediction tasks to infer the initial pose to approximate the transformation. The pose information may also be disentangled to model out-of-plane rotation in a higher dimensional space. In one configuration, a two-branch encoder-decoder architecture is used to disentangle pose information from other factors.

As discussed, the orbit of an object under a group transformation G is the collection of all feature points of the object under various instantiations of the transform, G(k), where k is the angle of view. For a continuous transform, because each change in the driving parameter results in a change in feature values, the orbit may be a continuous and continuously differentiable function. Various conditions in an image may affect the shape of the orbit.

In one example, when the view of the object has no visible details (as expressed in a change of feature values) over a range of the angle of view k, the orbit may stall and temporarily coincides in a point. As another example, when the object includes cavities, the orbit may demonstrate discontinuities in the feature string when a new facet of the object comes into view. In yet another example, when the object is rotationally repetitive in the direction of the viewpoint, and the illumination does not break that symmetry, the orbit may self-intersect. Aspects of the present disclosure may exclude the aforementioned examples that affect the shape of the orbit. In one configuration, the orbit is continuous, non-self-intersecting, and continuously differentiable. As the pose space is discretized uniformly into N pose classes, the orbit becomes a discrete and ordered set of feature points spanning the orbit.

The orbit of an object under pose variation may be defined as $O=\{f(k_i;o_{id})|k_i \in K\}$, where K is the set of angles corresponding to the sampled pose classes, and $f(k_i;o_{id})$ is the representation (e.g., point in the feature space, of object $o_{id}$, under viewpoint angle $k_i$). The cardinality of the orbit is N, $|O|=N$. The function $f(k_1;o_{id})$ represents the one available example. The function $f(k_{i+1};o_{id})$ is $\Delta k$-degree rotated over $f(k_i;o_{id})$, and $f(k_{i+t};o_{id})$ is t $\Delta k$-degree rotated.

Two images $x_i$ and $x_j$ may depict the same object instance. When the orbit generation for each image is ideal, $O_{xi}$ and $O_{xj}$ include the same points and two sets of points are aligned after a δ-step shift, where $\delta \Delta k$ is the angle difference between poses of a first image $x_i$ and a second image $x_j$. In one configuration, an instance recognition function is used for setting the instance label $y_t$ of the test image $x_t$ based on the label of the reference image $x_i$. In this configuration, the instance label $y_t$ of the test image $x_t$ is the label of the reference image $x_i$ in a reference set $\Omega_s$ having an orbit $O_{xi}$ that is closest to the orbit of the test image $O_{xt}$, expressed by:

$$y_t = \underset{y_t}{\operatorname{argmax}} M(O_{xi}, O_{xt}), \quad (2)$$

where M is the metric function measuring the similarity of two orbits. M is defined as:

$$M(O_{xi}, O_{xt}) = \max_{\delta=0,1,\ldots N-1} \sum_{j=1}^{N} <f_{j+\delta}^{x_i}, f_j^{x_t}>, \quad (3)$$

where $O_{xi}=\{f_j^{x_i}|j=1, 2, \ldots, N\}$ and $O_{xt}=\{f_j^{x_t}|j=1, 2, \ldots, N\}$. +δ refers to a circulant shift by δ steps. The proposed metric function M considers the circulant shifts and takes the maximum assuming the two orbits will have the highest similarity when re aligned according to the viewpoint angles. M uses a sequence-to-sequence comparison, considering the sequence of ordered points on an orbit jointly. In this way, M is robust against generation errors made on individual points during orbit generation.

In one configuration, pose recognition is performed after recognizing the instance identity. The instance in the test image may be recognized as $y_i$, with the corresponding reference image $x_i$. The pose label $p_t$ of the instance in image $x_t$ can be determined after obtaining the angle $k_t$ as $$k_t=k_i+\delta \cdot \Delta k, \quad (4)$$

where $k_i$ is the viewpoint angle of $x_i$ and $$\hat{\delta} = \underset{\delta=0,1,\ldots N-1}{\operatorname{argmax}} \sum_{j=1}^{N} <f_{j+\delta}^{x_i}, f_j^{x_t}>. \quad (5)$$

Figure 11:
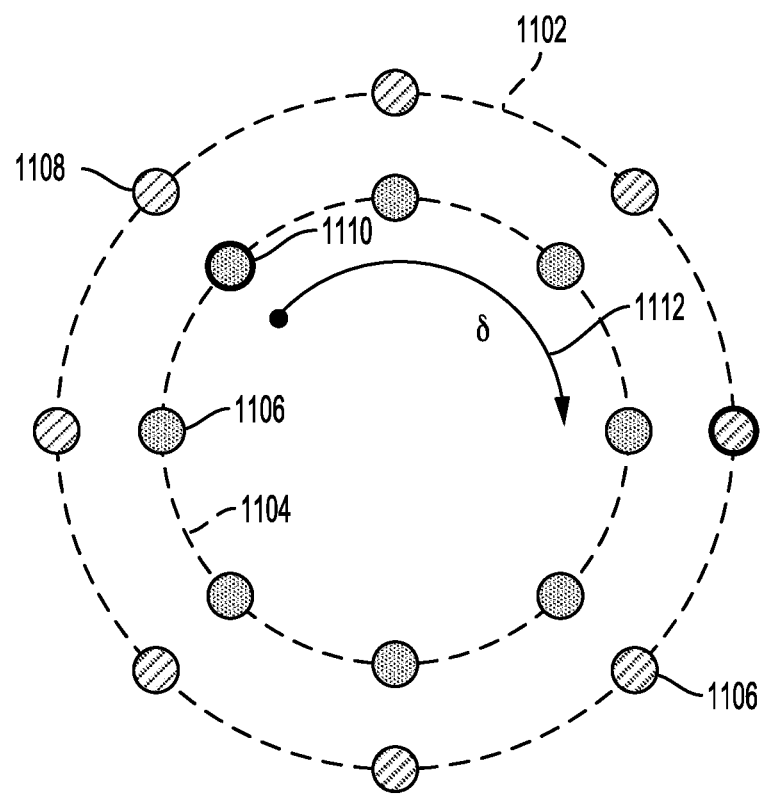
FIG. 11 illustrates an example of orbit comparison according to aspects of the present disclosure.

FIG. 11 illustrates an example of a comparison of two orbits based on aspects of the present disclosure. As shown in FIG. 11, a similarity between two orbits is measured using circulant shifts. The similarity measurements may be referred to as a convolution or correlation between two signals. As previously discussed, M takes the maximum over all the circulant shifts, assuming the similarity is at maximum when the orbits are aligned (e.g., poses are matched). In one configuration, when performing object recognition, an orbit is generated for both the reference image and the test images. The orbits are compared to recognize an instance of the reference image. That is, when the orbits match, the system may recognize the test image includes an instance of the same object from the reference image. The object may have different poses in the reference and test images.

As shown in FIG. 11, a first orbit 1102 for a test image is compared to a second orbit 1104 for a reference image. The two orbits 1102, 1104 have a same set of points 1106. After a δ-step shift, where $\delta \Delta k$ is the angle difference between poses of $x_i$ and $x_j$, two points 1108, 1110 should be aligned. That is, the second orbit 1104 may be rotated in a direction 1112 to align two points 1108, 1110 on the orbits 1102 1104. In this example, each point 1106 for the first orbit 1102 is a representation $f$ (k;$o_{x_t}$) (e.g., point in the feature space, of object $o_{x_t}$, under viewpoint angle k). Additionally, each point 1106 for the second orbit 1104 is a representation $f(k;o_{x_i})$ (e.g., point in the feature space, of object $o_{x_i}$, under viewpoint angle k). A specific point, such as the first point 1108 of the first orbit 1102 may be a representation $f(k_t;o_{x_t})$, and the second point 1110 of the second orbit 1104 may be a representation $f(k_i;o_{x_j})$.

In one configuration, an orbit generator is taught to generate the orbit of an object under group transformation G given a single view of the object. A two-branch architecture may be used when the orbit generator is in the learning phase (see FIG. 12). The two branches may be similarly parametrized (e.g., identical). Each branch has an encoder-decoder architecture.

In the present configuration, the encoder receives an image as an input and encodes the image into a latent representation $f_{encoder}$, divided into two parts, identity representation $f_{id}$ and pose information $f_{pose}$. $f_{id}$ captures the identity information of the object $o_{id}$. The encoder recovers the information loss that occurs when a 3D instance is projected onto the camera sensor and infers an input pose parameter. Disentanglement is imposed at the output units of the encoder by a hard-slicing operation on the representation. Hard-slicing enforces the certain bits of $f_{encoder}$ to account for only pose and other bits to account for identity related information.

The map computed by encoder block is $F_e$ such that $F_e: \mathbb{X} \to \mathbb{P}$. $\mathbb{P}$ is the space where pose units, $f_{pose}$, reside. It is desirable to enforce a group structure $H \in \mathbb{P}$ that will transform similar to the group transformation G.

$$H = \left\{ e, h \mid e = h_k, h_k = \underbrace{h \cdot \ldots \cdot h \cdot \ldots \cdot h}_{k \text{ times}} \right\}. \quad (6)$$

Homomorphy is established between groups $G \in \mathbb{R}^3$ and $H \in \mathbb{P}$ using the encoder as follows:

$$\mathcal{F}_e[g \cdot x] \to \mathcal{F}_e[g] * \mathcal{F}_e[x], \quad (7)$$

where · and * are the operators of G and H, respectively. As previously discussed, g is a 3D rotation matrix for rotation around the z-axis, and hence · is a matrix multiplication. On the other hand, the choice of * is arbitrary, still matrix multiplication may be used. $\mathcal{F}_e[g]$ corresponds to a generator function $h \in H$ in equation 8.

$$\mathcal{F}_e[g \cdot x] \to \mathcal{F}_e[g] * f_{pose} \quad (8)$$

$$\mathcal{F}_e[g \cdot x] \to h * f_{pose}. \quad (9)$$

The orbit generation is formulated as traversing on the manifold with pose as the varying factor. The traversal is achieved in a recurrent and incremental manner, where each step introduces a small local transformation in pose (e.g., 10-degree) shift. The local transformation in each recurrent step is modeled as a linear transformation on the latent pose representation. For example, $f_{pose}^t = B f_{pose}^{t-1}$. B is the matrix expressing the local transformation, which will be learned. At each time step t, the decoder concatenates the untouched $f_{id}$ and the pose representation $f_{pose}$, and reconstructs the image with the corresponding pose based on the concatenation.

In one configuration, a unit swap encourage $f_{pose}$ to contain as little identity-related information as possible and vice versa. Pose is a shareable property across instances of a same category and even across instances of different categories. Hence, enforcing the shareable pose property may reduce information leakage from to $f_{id}$ to $f_{pose}$, thereby, improving disentanglement. To implement unit swap, a second branch computing the same function, $F_e$, is specified. The encoders receive two images depicting two instances with pose parameters, $\theta^1$ and $\theta^2$. At this point, encoders compute $f_{pose}^1$, $f_{pose}^2$, $f_{id}^1$, and $f_{id}^2$. Any unit type may be swapped. Aspects of the present disclosure swap pose units. Therefore, the identity units are untouched but swap pose units, $f_{pose}^1$ and $f_{pose}^2$, across branches imply the pose of both instances are altered without affecting their identity.

As discussed above, orbit generation is improved by disentangling the identity information and the pose information. In one configuration, pose representations are swapped across two branches during sequence generation. That is, the two-branch network receives, as an input, two images showing two different instances (e.g., car1 and car2) in the same pose. The swap causes the network to encode properties that characterize the instances uniquely (e.g., the identity information $o_{id}$) into $f_{id}$ and the common pose information shared by the two images into $f_{pose}$. The two-branch architecture with a unit swap improves the training of the orbit generator. The improved training leads to improved one shot instance and pose recognition. Note that after training, only one branch generates the orbit of an object given a single image of the object.

After a pose swap is realized, the network computes the elements of the pose orbit respecting the group structure defined in equation 7. Consecutive pose units corresponding to the next pose parameter over the circle (e.g., topology of the pose space) can be computed from the previous pose unit by a multiplication operation such that $f_{pose}^t = h f_{pose}^{t-1}$. Additionally, a decoder receives the identity unit along with the generated pose unit sequence and concatenates them back (e.g., undo hard-slicing). The decoder then learns a map $F_d: \mathbb{H} \to \mathbb{X}$ to reconstruct the orbit $X_g$ in pixel space. Later, $X_g$ will be used to supervise the network with standard gradient optimization with a mean squared error objective.

The encoder includes multiple convolutional layers. In one configuration, the encoder includes three convolution layers with a 5×5 kernel size and a stride of two followed by activations (e.g., rectified linear unit (ReLU) activations). In this configuration, the feature maps are down sampled by convolution strides. That is, hard-pooling layers may not be used. The convolution-activation blocks are followed by fully connected layers (e.g., two fully connected layers) resulting in a representation $f_{encoder}$, such as a 1024-dimensional (1024-d) representation. $f_{encoder}$ may be sliced into pose units and identity units, such as a 512-dimensional (512-d) identity unit $f_{id}$ and 512-dimensional pose unit $f_{pose}$. In one configuration, the decoder is symmetric to the encoder and convolution layers are replaced by deconvolution layers. At each deconvolution-activation block, input feature maps are upsampled by a factor, such as a factor of two. Reconstructions of the images are obtained at the output of the decoder.

The orbit generator may be trained on a multi-view training set $D_{train}$ having training object instances $N_m$. The training instances $N_m$ are different from the reference instances $N_s$ where recognition will be conducted. Still, both the training object instances $N_m$ and the reference object instances $N_s$ are from the same category. Each of the training object instances $N_m$ is described by a set of observations, covering the range of variations in view induced by the transform G. For each instance in the multi-view training set $D_{train}$, a full orbit may be covered with images at an approximately ten-degree interval in pose.

The training may be based on the pixel-wise reconstructions of the images over all time steps:

$$\mathcal{L} = \Sigma_{i=1}^{N_b} \Sigma_{t=1}^{T} (\|x_{i,1}^t - \text{dec}(\text{cat}(f_{(id,i,1)}, f_{(pose,i,1)}^t))\|_2^2 + \|x_{i,2}^t - \text{dec}(\text{cat}(f_{(id,i,2)}, f_{(pose,i,2)}^t))\|_2^2), \quad (10)$$

where $N_b$ is the batch size, T is the length of the sequence to be generated. $x_{i,1}^t$ and $x_{i,2}^t$ are the ground truth images to be reconstructed at time step t for the two branches, respectively. dec( ) is the decoder and cat( ) is the concatenator. $f_{(id,i,1)}$ and $f_{(id,i,2)}$ are the identity representations, constant over time. $f_{(pose,i,1)}^t$ and $f_{(pose,i,2)}^t$ are the pose representations at time step t for the two branches, respectively.

The object recognition system may be trained by showing two different object instances (e.g., identities) of a given class (e.g., cars) in a same pose or a different pose. Rotated states (images) of the inputs are used as a training signal.

The mean squared error (MSE) is minimized over all generated images and ground truth pairs via a standard gradient descent optimizer, such as adaptive moment estimation (ADAM). As an extra regularizer, the network predicts binary masks for the objects and minimizes the mean squared error between the mask predictions and ground truths over all generation steps.

Representations are inherently invariant to pose/identity. Aspects of the present disclosure provide for independent extraction of pose and identity. In one configuration, the object recognition system generates new samples at both the representation level and the image level. Additionally, in one configuration, the object recognition system generates samples from the pose manifold and improves recognition.

Figure 12A:
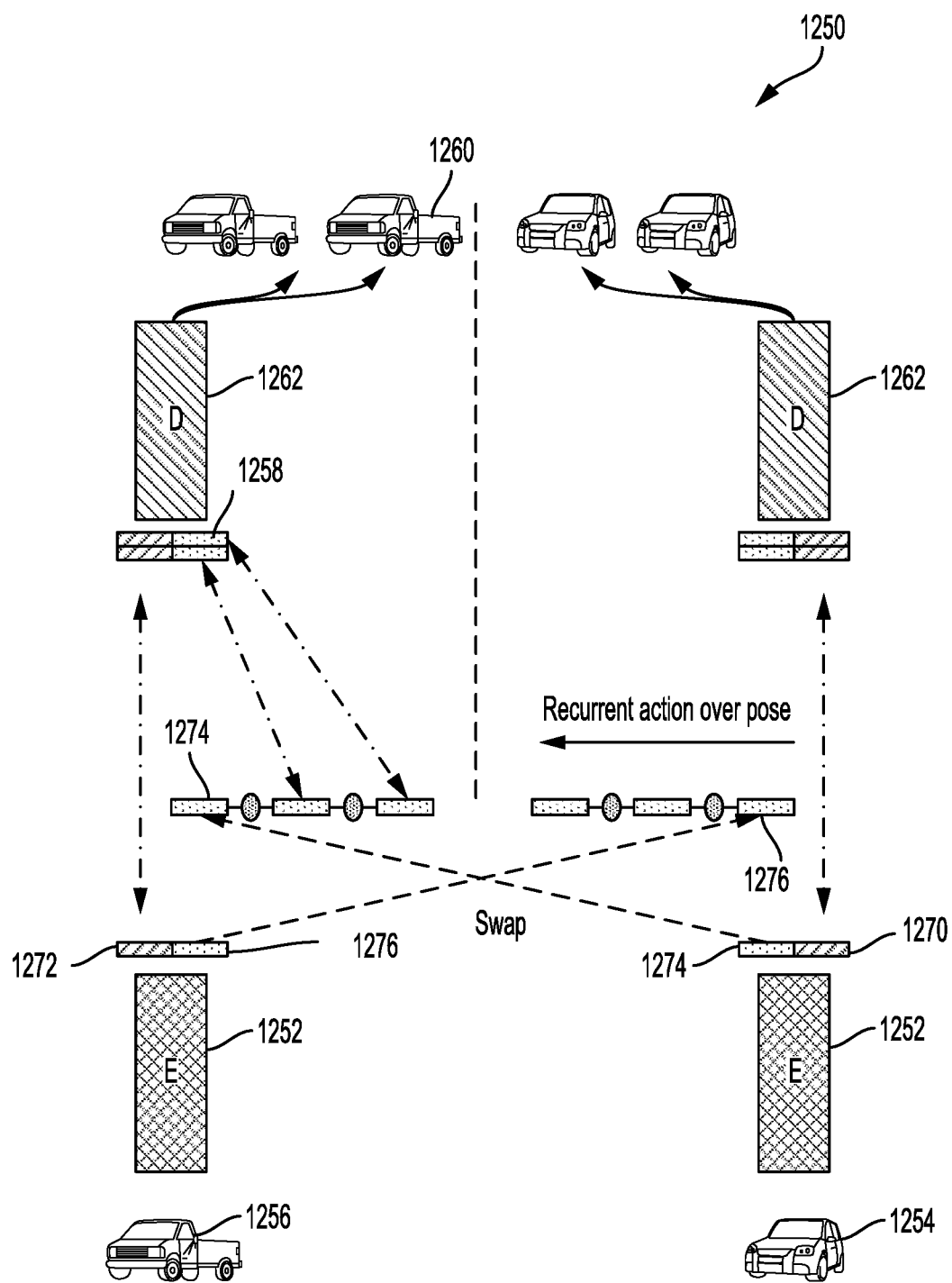
FIG. 12A illustrates a diagram of an object recognition system according to aspects of the present disclosure.
Figure 12B:
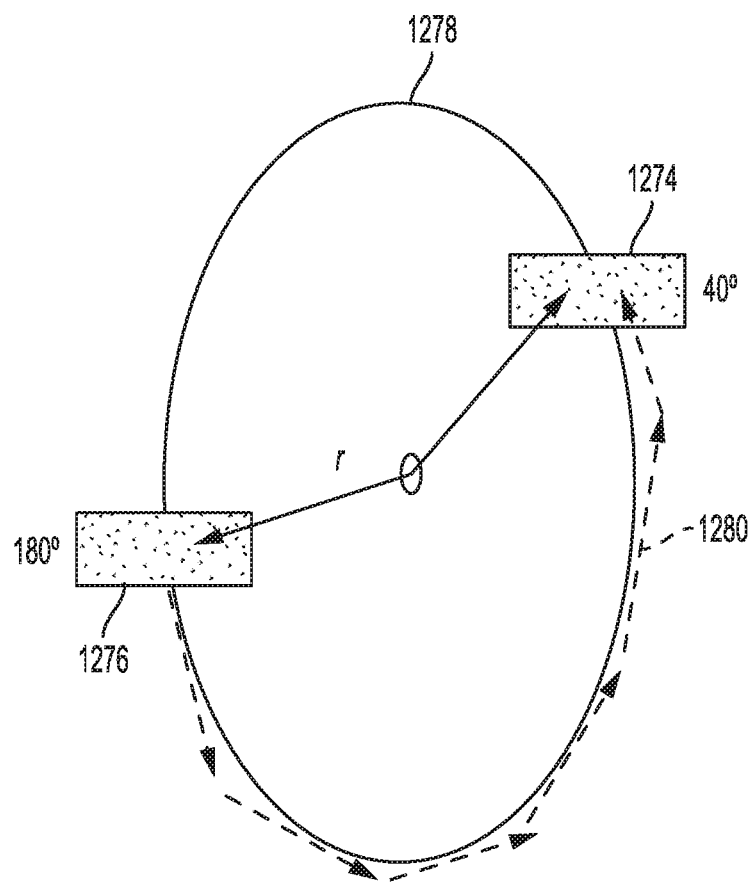
FIG. 12B illustrates a pose rotation diagram according to aspects of the present disclosure.

FIG. 12A illustrates an example of an orbit generator 1250 according to aspects of the present disclosure. In the example of FIG. 12A, the orbit generator 1250 is an encoder-decoder architecture (e.g., encoder-decoder artificial neural network). Each encoder 1252 may accept an input 1254, 1256, such as an image. The inputs 1254, 1256 may have a same or a different pose. The encoders 1252 generate an abstract representation of the inputs 1254, 1256. The activations of the last layer in the encoder 1252 are split (e.g., disentangled), namely, into identity units 1270, 1272 and pose units 1274, 1276. The identity units 1270, 1272 contain intrinsic identity information of the inputs 1254, 1256, independent of the pose units 1274, 1276. Pose units 1274, 1276 are isolated from the identity units 1270, 1272 and contain information that is relevant to the pose of the instance. As shown in FIG. 12B, the pose unit 1274 from the first input 1254 is swapped with the pose unit 1276 of the second input 1256. The second branch and the swap operation provide for the improved isolation of the pose unit 1274, 1276 from the identity unit 1270, 1272.

As shown in FIG. 12A, after the swap, a series of recurrent actions (e.g., matrix multiplications) are performed on the pose units 1274, 1276 until a desired number of steps are obtained in the pose parameter space. Recursion provides pose codes for consecutive frames of an out-of-plane rotation sequence with a predefined step. When a desired number of pose units are generated, each pose unit is concatenated with the identity to obtain an original representation dimensionality 1258. In the present configuration, the identity units 1270, 1272 are maintained and are input to a decoder 1262. The decoder 1262 receives the original representation dimensionality 1258 and generates target images 1260 and binary object masks by a series of deconvolutions.

In conventional systems, a feature may be invariant to all or most other features, causing a lack of distinction between similar instances. Fully invariant features may be unnecessary when the invariance of a feature does not occur. Furthermore, each separate feature may be completely invariant. Still, the combination of features may be unnecessary when specific combinations do not jointly occur or always jointly occur.

For example, a conventional object recognition system may determine the eyes of an object as a feature. However, eyes are not distinct features of an object and searching for only the eyes would not distinguish the object of the query from other objects in a dataset. It is desirable to have features that are invariant and highlight a distinct condition of an object.

Geometry distortion under various views generates a very large variant group. Therefore, in one configuration, the pose of an object is used as a starting case. A close relationship between the combined feature set is created by generating all possible poses from the one example and verifying the candidate target image for one such pose.

Learning follows a two-step approach. At the first stage, the orbit generator is trained only on a synthetic data training set $D_{train}$. However, there may be a gap between synthetic data and real data. In order to bridge the gap, an intermediate domain adaptation step tunes the real data representation. To that end domain, an adaptation model is used.

Learning may be driven by mean squared error between reconstructed orbits and corresponding ground truth orbits as follows:

$$\mathcal{L} = \Sigma_{i,j=1}^{N_b} \Sigma_{k=0}^{k-1} \|X_g^{(i,k)} - X_{g,gt}^{(i,k)}\|_2^2 + \|X_g^{(i,k)} - X_{g,gt}^{(i,k)}\|_2^2 \quad (11)$$

where $N_b$, $X_g^{(i,k)}$, $X_{g,gt}^{(i,k)}$ and are the batch size, reconstructed orbit, and corresponding ground truth orbit, respectively. Because two inputs are input at every iteration, the notation of i and j denote a pair such as $x^i$ and $x^j$.

The orbit generator uses labeled orbits for training. However, existing benchmarks do not contain complete orbits or contain partial orbits (e.g., only a few parametrizations of an instance is available). Thus, for training, a training scheme uses fully annotated synthetic data to drive learning on partially annotated real datasets. In this scheme, a unit swap is used. First, a synthetically trained orbit generator is locked, and its encoder is copied without sharing. The new encoder is referred to as the real encoder because it receives a real input. The synthetically trained encoders may be referred to as synthetic encoders. During training, two synthetic images with arbitrary poses are input to the synthetic encoders. At the same time, the real encoder receives a real input. There is no access to a ground truth orbit of the real input. Therefore, the computed $f_{pose}^{real}$ is swapped with one of the synthetic pose units, $f_{pose}^{synth}$. The synthetic decoders reconstruct the orbits following the same optimization objective described earlier. Additionally, the real encoder is optimized based on the reconstruction errors made over the synthetic orbits. Note that real data is used to fine-tune the parameters of the real encoder. Orbit generation relies on the generator matrix learned from synthetic data.

In one configuration, an offline-learned orbit generator is used in identity recognition from a single visual shot. The orbit is the collection of all feature points of an object when submitted to a transform. In the present configuration, the transform refers to the transformation of the pose by considering different viewpoints of the object. In the feature space and subsequently in the image space, unseen poses are generated from one visual example with the aid of a network trained on similar objects. The unseen views are discretely sampled with an interval, such as 10-degree differences in view point.

During the learning phase, $K_1, \ldots K_i$ object images of all poses are available. In one configuration, every $K_i$ is represented by a predetermined number of poses, such as thirty poses. In the learning phase, the object recognition system learns a manifold $M_j$ in the feature space varying with pose as the parameter and the structure of the manifold is shared across all instances of the same type j. Given a new instance N, the object recognition system predicts the orbit of the new instance N in a feature space while varying a pose parameter p. The orbit can be one-dimensional (1D) for a horizontal viewpoint change or 3D for any viewpoint change.

As previously discussed, in the separation of pose and identity information, aspects of the present disclosure enforce strong disentanglement by using a pose sharing network architecture to regularize the invariant representation. Aspects of the present disclosure are not limited to pose transform and are also applicable to other transforms.

The unique combination for one identity and one pose will follow from regenerating an image of the object with that identity and pose. Partial occlusions, shadows, inner reflections, and peculiarities follow from regenerated images for that identity and pose. Given one image of one instance N in an arbitrary pose and given an orbit generator, the object recognition system provides the full orbit $O_N$ of the one instance N including all other poses p.

In one configuration, given an object (e.g., query) and one or more candidate targets, the object recognition system may determine the different poses for the object and/or the one or more candidate targets to determine whether the object matches the one or more candidate targets. A similarity function may determine whether the object matches the one or more candidate targets.

For example, M( ) is a similarity function for measuring the similarity between orbits and measuring the similarity between an orbit and an image. M( ) may have various forms, such as, $M(O_R, O_T)$, $M(O_R, T)$, or $M(R, O_T)$. $M(O_R, O_T)$ compares a reference image orbit R and a new image orbit T. $M(O_R, T)$ compares the new image T to the reference image orbit R. $M(R, O_T)$ compares the reference image R to the new image orbit T. The best match may be determined by maximizing M( ).

More specifically, a metric is used to compare two given orbits for the purposes of identity and pose recognition. Two orbits $X_h^{(1)}$ and $X_h^{(2)}$ belong to two inputs $x_1$ and $x_2$, respectively. Subscript$_h$ implies that homomorphy has been established between groups G and H and that orbits are generated obeying h∈H. Two ordered sets are established, $X_h^{(1)}=\{h_N \cdot x_1, h_{N+1} \cdot x_1, \ldots, h_k \cdot x_1, \ldots, h_{N-1} \cdot x_1\}$ and $X_h^{(2)}=\{h_M \cdot x_2, h_{M+1} \cdot x_2, \ldots, h_k \cdot x_2, \ldots, h_{M-1} \cdot x_2\}$.

The orbit metric is a convolution operation without flipping the second orbit as in correlation:

$$M_{X_h^{(1)} \leftarrow X_h^{(2)}}(\delta) = \Sigma_{k=0}^{K-1} <X_h^{(1,k)}, h_\delta \cdot X_h^{(2,k)}>, \quad (12)$$

where $M_{X_h^{(1)} \leftarrow X_h^{(2)}}$ denotes that $X_h^{(1)}$ is the reference orbit whereas $X_h^{(2)}$ is the test orbit. The notation of $X_h^{(i,k)}$ denotes the kth element in $X_h^{(i)}$. The second term inside <. , . > corresponds to a cyclic shift in $X_h^{(2)}$ implying that all the elements are rotated by $\delta\Delta\theta$.

The orbit metric produces a one-dimensional (1D) signal varying with the shift parameter, δ, denoted by $M(\delta) = M_{X_h^{(1)} \leftarrow X_h^{(2)}}(\delta)$ with $\delta \in [0, K-1]$. For identity recognition, the largest peak value of the output signal is used as a similarity score between reference and test instances. Equation 13 obtains the largest peak value:

$$\text{sim}(x_1, x_2) = \max(M(\delta)). \quad (13)$$

For pose estimation, the amount of shift, Δδ, corresponding to the largest peak value is used, where Δδ is defined as:

$$\Delta\delta = \underset{\delta=0,\ldots,K-1}{\operatorname{argmax}} M(\delta), \quad (14)$$

where Δδ is used to compute the pose of the test instance as follows:

$$\theta^{test} = \mathrm{mod}(\theta^{ref} + \Delta\delta\Delta\theta, 2\pi) \quad (15)$$

The orbit metric is a weighted similarity function taking into account all the views of given instances following equation 11, as shown below:

$$M_{X_h^{(1)} \leftarrow X_h^{(2)}}(\delta) = \sum_{k=0}^{K-1} (h_{N+k} \cdot x_1)^T (h_{M+k+\delta} \cdot x_2) \quad (16)$$

$$= \sum_{k=0}^{K-1} x_1^T \cdot (h_{N+k}^T \cdot h_{M+k+\delta}) \cdot x_2$$

$$= \sum_{k=0}^{K-1} x_1^T \cdot S \cdot x_2,$$

where S is a measure for the similarity of views, weighing less for irrelevant view pairs and weighing more for similar views. This property permits a comparison of novel views of two instances, even though they are represented by one shot. T denotes the transpose of the given vector $x_1$ or matrix $h_{N+K}$.

As shown in FIG. 12B, a pose unit 1274, 1276 may be disentangled from an identity unit 1270, 1272. In one configuration, a structure (e.g., constraint) may be enforced on each pose unit 1274, 1276. As shown in FIG. 12B, each pose unit 1274, 1276 falls onto an orbit 1278. Each position on the orbit 1278 corresponds to one degree from three-hundred sixty degrees. In the current example, a first pose unit 1274 corresponds to the first input 1254 that has a pose of forty degrees. Also, a second pose unit 1276 corresponds to the second input 1256 that has a pose of one-hundred eighty degrees. That is, the first input 1254 has a pose of forty degrees and the second input 1256 has a pose of one-hundred eighty degrees. As such, there is a difference of one-hundred forty degrees between the first pose unit 1274 and the second pose unit 1276. The difference in degrees between the pose units 1274, 1276 may be represented as a constant r. The given degrees are used as an example and the images of the first input 1254 and the second input 1256 in FIG. 12A do not correlate to the aforementioned degrees.

During training, the 3D rotation matrix g may be applied n times to the second pose unit 1276 to rotate the second pose unit 1276 n times, such that a representation of the second pose unit 1276 is similar to a representation of the first pose unit 1274. Where n is the number of steps 1280 between the degree of the second pose unit 1276 and the first pose unit 1274. Each step 1280 corresponds to an amount of change in the degree of the second pose unit 1276 obtained by applying the 3D rotation matrix g to the second pose unit 1276. In this example, the second pose unit 1276 is rotated six times to reach a forty-degree pose that corresponds to the representation of the first pose unit 1274.

The rotated second pose unit 1276 may be compared to a real forty-degree pose of the first input 1254 (represented by the first pose unit 1274) to calculate a loss between the rotated second pose unit 1276 and the real forty-degree pose. The weights and parameters of the orbit generator 1250 may be updated to minimize the loss. The real forty-degree pose (e.g., ground truth pose) is provided by the training sets of synthetic and real images. Constraints are computed using the relationships of the pose units. The ground truth information is used to measure how well the constraints are satisfied.

Training the orbit generator with the constraints may improve robustness against neighboring views. That is, training the orbit generator with the aforementioned constraints may improve a joint pose and identity model's ability to detect nuanced changes in the pose of an object. Specifically, the nuanced changes may be learned by emphasizing the differences between neighboring poses during training, such that loss function reduces the error between determining a first pose and a neighboring second pose. Neighboring poses refer to poses with a small difference between pose degrees. For example, a forty-degree pose and a forty-five degree pose may be considered neighboring poses. Alternatively, a forty-degree pose and a ninety-degree pose are not considered neighboring poses.

The ability to distinguish neighboring poses may improve the predictions of an object's intent. For example, a joint pose and identity detection model may be defined in an autonomous vehicle. The joint pose and identity detection model may detect an oncoming car at a first pose degree and subsequently detect a second pose degree. The difference between the first pose degree and second pose degree may indicate the two pose degrees are neighboring poses. Because the first pose degree and second pose degree are neighboring poses, the joint pose and identity detection model may predict the oncoming car is turning in front of the autonomous vehicle. Based on the prediction, the joint pose and identity detection model may adjust an action of the autonomous vehicle to prevent a collision with the oncoming car.

Figure 13:
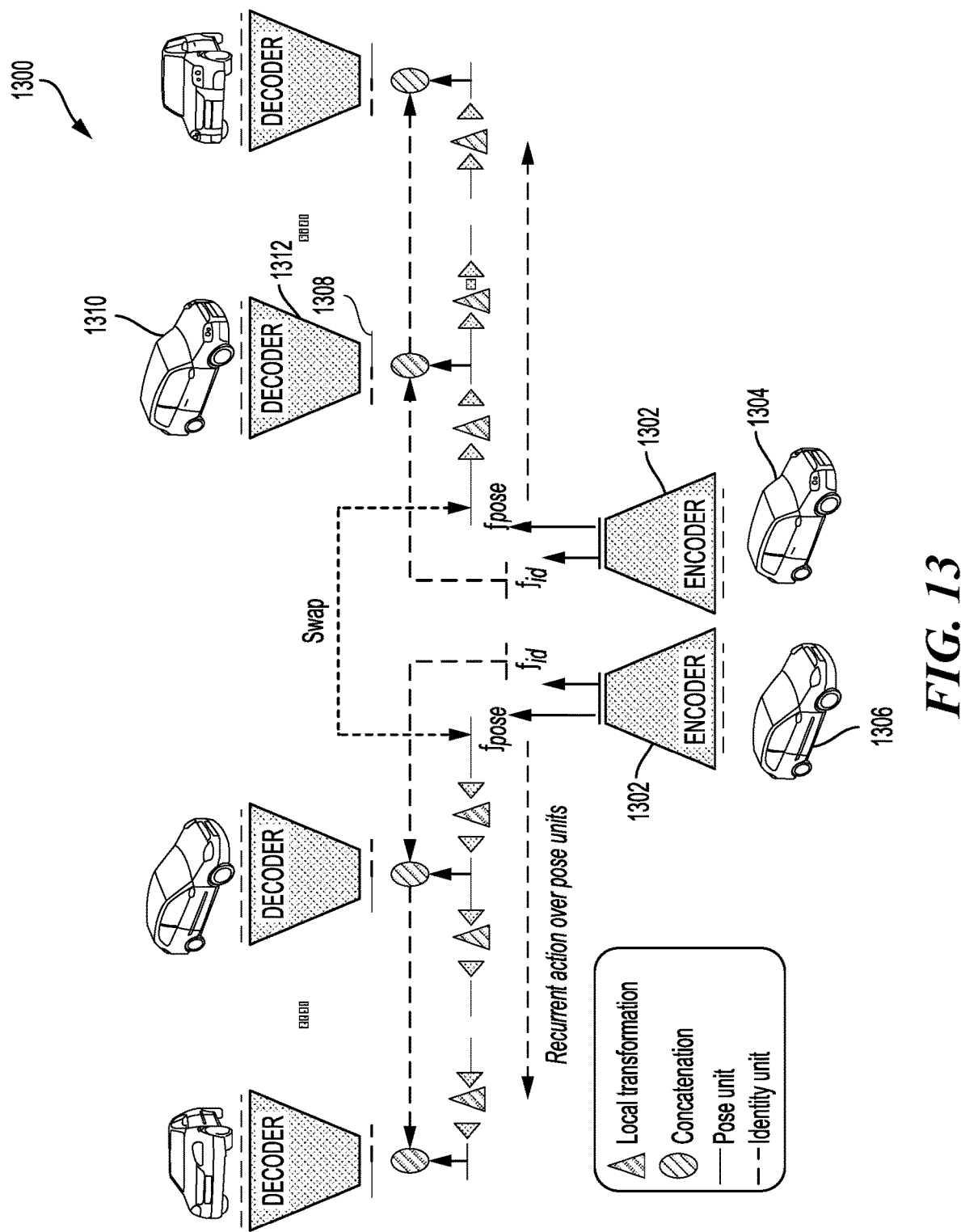
FIG. 13 illustrates a diagram of an object recognition system according to aspects of the present disclosure.

FIG. 13 illustrates another example of an orbit generator 1300, according to aspects of the present disclosure. In one configuration, the orbit generator includes two substantially similar or identical (shared-parameter) branches of convolution and deconvolution operator stacks. In the example of FIG. 13, the orbit generator 1300 is an encoder-decoder architecture (e.g., encoder-decoder artificial neural network).

In one configuration, each encoder 1302 accepts an input 1304, 1306, such as an image, and produces an abstract representation of the input. The inputs 1304, 1306 may have a same pose or a different pose. The activations of the last layer in the encoder are split, namely, into identity units and pose units. Identity units contain intrinsic identity information of the input, independent of the pose units. Pose units are isolated from the identity units and contain information relevant to the pose of the instance. As shown in FIG. 13, the pose information from a first input 1304 is swapped with the pose information of a second input 1306. The second branch and the swap operation provide for the improved isolation of the pose information from the identity information.

Without the swap operation, the network is not constrained to learn isolated representations of pose and identity. The swap operation also provides for sharing the pose information across different object instances, which improves pose recognition and also improves the purity of identity information. In one configuration, the swap operation is performed even when pose parameters of two inputs are different. For example, a first car instance $x_1$ may have a first posepi and a second car instance $x_2$ may have a second pose $p_2$. According to aspects of the present disclosure, the swap operation may be performed when the first pose $p_1$ is the same as the second pose $p_2$. Alternatively, the swap operation may be performed when the first pose $p_1$ is different from the second pose $p_2$.

As shown in FIG. 13, after the swap, a series of matrix multiplications (recursions) are performed on the pose units until a desired number of steps are obtained in the pose parameter space. In the present configuration, the identity units are maintained. Recursion provides pose codes for consecutive frames of an out-of-plane rotation sequence with a predefined step. When a desired number of pose units are generated, each pose unit is concatenated with the identity to obtain an original representation dimensionality 1308. A decoder 1312 receives the original representation dimensionality 1308 and generates target images 1310 and binary object masks by a series of deconvolutions. The generated target images 1310 are compared to a ground-truth image. Each target image of the generated target images 1310 is in a different pose.

Figure 14A:
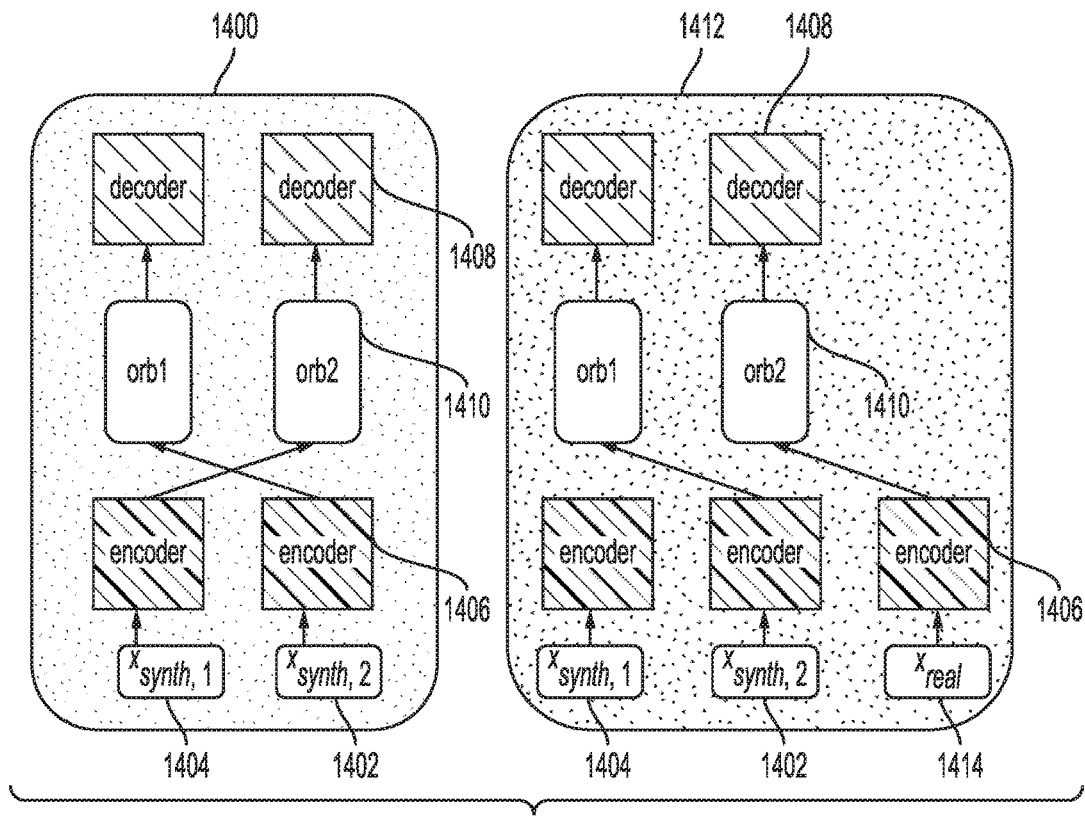
FIGS. 14A, 14B, and 14C illustrate diagrams of object recognition systems according to aspects of the present disclosure.

FIG. 14A illustrates an example of training a one shot object recognition model using domain adaptation, according to aspects of the present disclosure. The example of FIG. 14A may be used when a real training dataset does not include multiple views of the training instances. That is, the real training dataset includes a single view of an instance. As shown in FIG. 14A, at a first stage 1400, a one shot object recognition model is trained using synthetic inputs $(x_{synth,1})$ 1402, $(x_{synth,2})$ 1404, such as images.

Encoders 1406 generate an abstract representation of the synthetic inputs 1402, 1404. The activations of the last layer in each encoder 1406 are split, namely, into identity units and pose units. Identity units contain intrinsic identity information of the input, independent of the pose units. Pose units are isolated from the identity units and contain information relevant to the pose of the instance. As shown in FIG. 14A, the pose information from a first input 1402 is swapped with the pose information of a second input 1404. A second branch and the swap operation improve isolation of the pose information from the identity information.

After the swap, orbit generators 1410 generate a series of recurrent actions (e.g., matrix multiplications), which are performed on the pose units until a desired number of steps are obtained in the pose parameter space. Recursion provides pose codes for consecutive frames of an out-of-plane rotation sequence with a predefined step. When a desired number of pose units are generated, each pose unit is concatenated with the identity to obtain an original representation dimensionality. In the present configuration, the identity units are maintained and are input to decoders 1408. The decoders 1408 receive the original representation dimensionality and generate target images and binary object masks by a series of deconvolutions. After generating the target images and binary object masks, the mean squared error (MSE) is minimized over all generated images and ground truth pairs via a standard gradient descent optimizer.

In one configuration, after training the encoders 1406 at the first stage 1400, one of the encoders 1406 is copied and used at a second stage 1412. In this example, two encoders 1406 are used in the first stage 1400 and three encoders 1406 are used in the second stage 1412. As shown in FIG. 14A, the copied encoder 1406 receives a real input $(x_{real})$ 1414. In the second stage 1412, the encoders 1406 generate an abstract representation of the synthetic input 1402 and the real input 1414. Pose units are isolated from the identity units and contain information relevant to the pose of the instance.

As shown in FIG. 14A, the pose information from the first synthetic input 1402 is swapped with the pose information of the real input 1414. In this example, swapping refers to giving the pose information from the first synthetic input 1402 to the second synthetic input 1404 (e.g., orbit generator 1410 in the branch of the second synthetic input 1404), and giving the pose information of the real input 1414 to the first synthetic input 1402 (e.g., orbit generator 1410 in the branch of the first synthetic input 1402). The second branch and the swap operation improve isolation of the pose information from the identity information.

After the swap, the orbit generators 1410 generate a desired number of pose units, and each pose unit is concatenated with the identity to obtain an original representation dimensionality. In the present configuration, the identity units are maintained and are input to the decoders 1408. The decoders 1408 receive the original representation dimensionality and generate target images and binary object masks by a series of deconvolutions. After generating the target images and binary object masks, the mean squared error (MSE) is minimized over all generated images and ground truth pairs via a standard gradient descent optimizer.

Figure 14B:
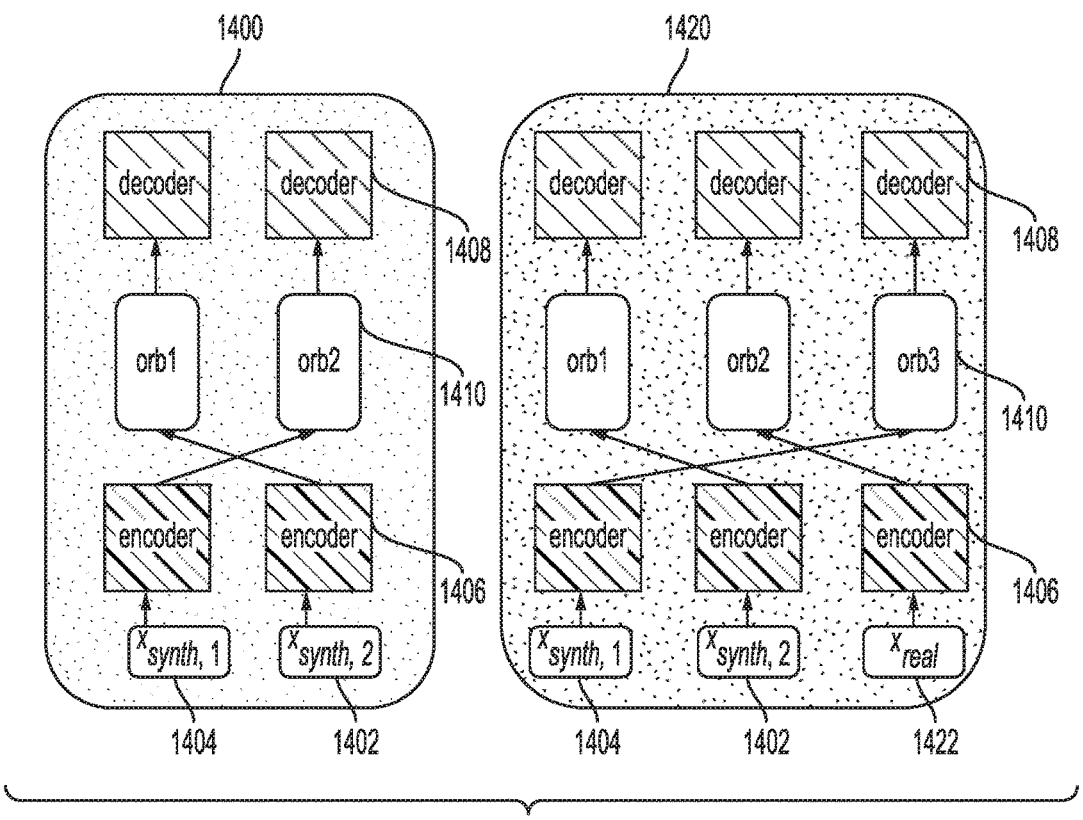

FIG. 14B illustrates another example of training a one shot object recognition model using domain adaptation, according to aspects of the present disclosure. The example of FIG. 14B may be used when a real dataset includes multiple views of training instances. The multiple views may not be all of the available views. In the example of FIG. 14B, the first stage 1400 is trained as discussed with regard to FIG. 14A.

Furthermore, as shown in FIG. 14B, at a second stage 1420, the pose swap is performed between synthetic inputs 1402, 1404 as well as between the synthetic inputs 1402, 1404 and the real input 1422. The swap is not limited to the swap shown in FIG. 14B, as the parameters may be swapped between different inputs. The decoders 1408 receive the original representation dimensionality from the orbit generators 1410 and generate target images and binary object masks by a series of deconvolutions. In the example of FIG. 14B, a third branch of the one shot object recognition model may be supervised to learn to reconstruct the real input image at different poses based on the multiple views of the real input.

Figure 14C:
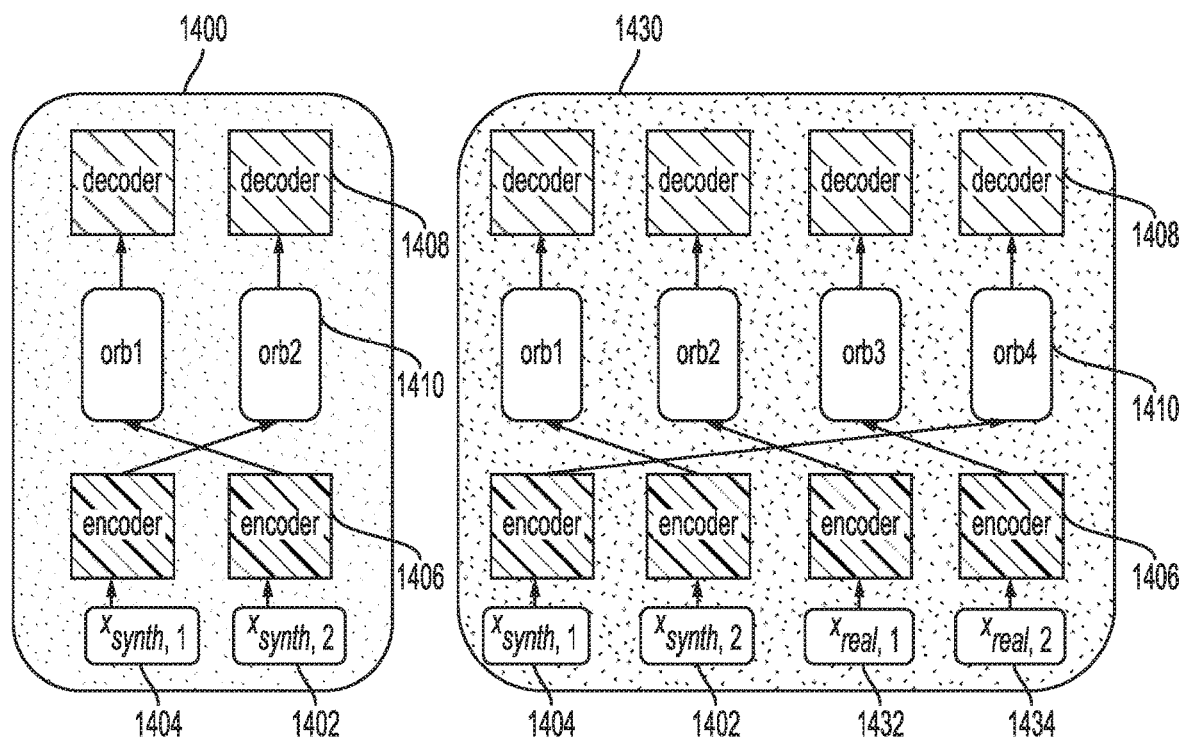

FIG. 14C illustrates another example of training a one shot object recognition model using domain adaptation according to aspects of the present disclosure. The example of FIG. 14C may be used with a real dataset including multiple views of training instances. The multiple views may not be all of the available views. In the example of FIG. 14C, the first stage 1400 is trained as discussed with regard to FIG. 14A.

Furthermore, as shown in FIG. 14C, at a second stage 1430, a third orbit generator 1410 is used as the pose information of a first real input ($x_{real,1}$) 1432, a second real input ($x_{real,2}$) 1434, and both synthetic inputs 1402, 1404 are swapped. The first real input 1432 and the second real input 1434 may be different poses of a same object, different poses of different objects, or same poses of different objects. The decoders 1408 receive the original representation dimensionality from the orbit generators 1410 and generate target images and binary object masks by a series of deconvolutions. The second stage 1430 of FIG. 14C may be used to add a discriminative loss over the identity units of the real input to improve identity recognition.

Figure 15A:
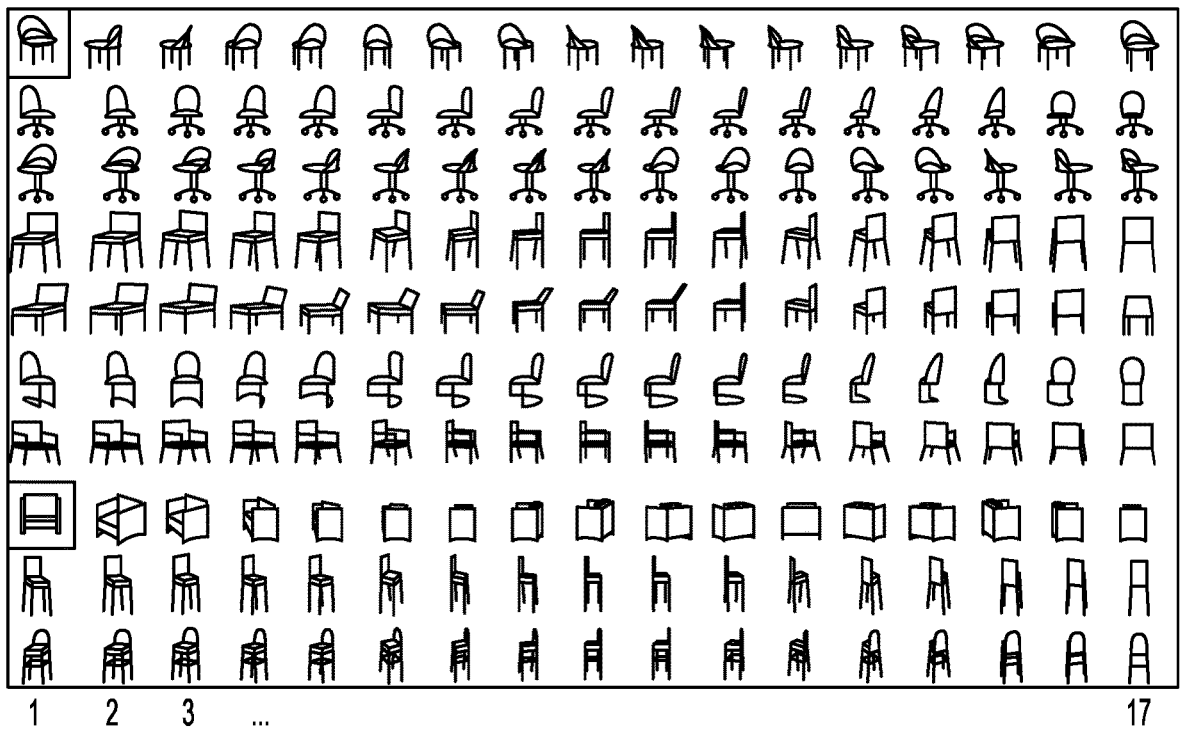
FIG. 15A illustrates an example of object rotation according to aspects of the present disclosure.

FIG. 15A illustrates an example of generating different poses from a single instance of an object, according to aspects of the present disclosure. In FIG. 15A, the objects in column 1 are single instances of an object. In one configuration, upon receiving the input of an object from column 1, the object recognition system determines a pose and identity of the object. Columns 2-17 of FIG. 15A illustrate hallucinations of the different poses of the single instance of an object from column 1. That is, columns 2-17 are predictions of the different poses of the object.

The single image of the object from column 1 may not have been seen a priori. In one configuration, the object recognition system uses the orbit generator learned from different known poses of similar objects to generate the hallucinations in columns 2-17. That is, the object recognition system predicts different views of an object based on a single instance of the object. In the example of FIG. 15A, each column of columns 2-17 is an approximate 10-degree rotation from the previous column.

Figure 15B:
FIG. 15B illustrates an example of object recognition based on identity according to aspects of the present disclosure.

FIG. 15B illustrates an example of object recognition according to aspects of the present disclosure. In one configuration, based on a single image of an object, such as a single image of an object in column 1 of FIG. 15B, the object recognition system identifies similar objects from any viewpoint (columns 2-17). In the example of FIG. 15B, the object recognition system only identifies the object and does not determine the object's pose.

As discussed above (see FIGS. 12A and 13), a one shot object recognition model may be trained using synthetic data. To improve the deployed one shot object recognition model (e.g., the model used during testing), the training may use synthetic inputs and real inputs. In one configuration, domain adaptation improves the deployed one shot object recognition model.

For domain adaptation, a model is trained using synthetic inputs. The model may be a trained model as described above with regard to FIGS. 12A and 13 (e.g., orbit generator 1250, 1300). After training the model with synthetic inputs, the domain adaptation copies the trained encoder (e.g., encoder 1302 or encoder 1252) and fine-tunes the model (e.g., neural network) with multiple synthetic inputs plus one or more real inputs. In one configuration, the swap operation is performed with the synthetic inputs and the real input.

Figure 16:
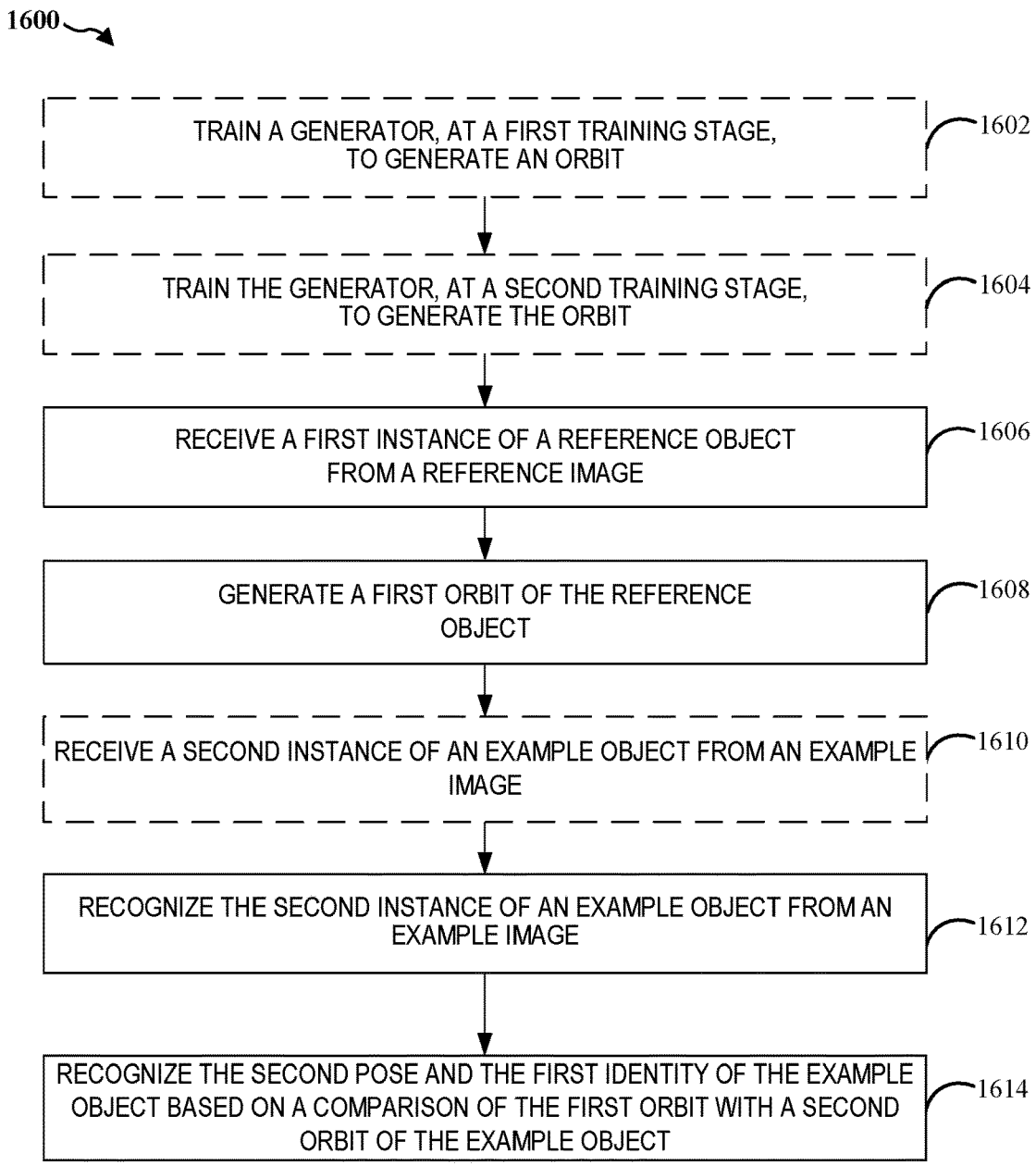
FIG. 16 illustrates a method for object recognition according to aspects of the present disclosure.

FIG. 16 illustrates a method 1600 for one shot object recognition using an artificial neural network, according to an aspect of the present disclosure. As shown in FIG. 16, in an optional configuration, at block 1602, the artificial neural network trains a generator (e.g., orbit generator), at a first training stage, to generate an orbit. The first training stage may use a two-branch encoder-decoder architecture that receives two or more of a synthetic image and/or a real image. The synthetic image(s) and/or a real image(s) may be images of a same or different object(s). Additionally, the synthetic image(s) and/or a real image(s) may have a same pose or different poses.

The generator may be trained with constraints over elements of the orbit. For example, two poses (e.g., pose units) may be generated during training. A 3D rotation matrix may be applied to the second pose to rotate the second pose, such that a representation of the second pose is similar to a representation of the first pose. The rotated second pose may be compared to a ground-truth pose of a first object represented by the first pose. The comparison may calculate a loss between the rotated second pose and the ground-truth pose. The weights and parameters of the generator may be updated to minimize the loss. Constraints are computed using the relationships of the pose units. The ground truth information is used to measure how well the constraints are satisfied.

In another optional configuration, at block 1604, the artificial neural network trains the generator, at a second training stage, to generate the orbit. The second training stage may use a multi-branch encoder-decoder architecture that receives two or more of the synthetic image and/or the real image. The multi-branch encoder-decoder architecture is based on the two-branch encoder-decoder architecture and a duplicated encoder of the two-branch encoder-decoder architecture. In one configuration, the duplicated encoder receives the real image.

After training the generator, at block 1606, the artificial neural network receives a first instance of a reference object from a reference image. In the first instance, the reference object has a first identity and a first pose. For example, the artificial neural network may receive an instance of a car (e.g., identity) in a reference image. The car may belong to a car class. The pose refers to the direction the reference object is facing in relation to a camera that captured the reference image.

At block 1608, based on the training, the artificial neural network generates an first orbit of the reference object. The first orbit includes additional poses of the reference object, such as a second pose that is different from the first pose. In one configuration, the first orbit is generated based on the first instance using the generator that was trained on different training objects of a same class as the reference object. For example, the reference object may be a two-door convertible and the generator may have been trained on different types of cars (e.g., sedans) from a car class.

At block 1610, in an optional configuration, the artificial neural network receives a second instance of an example object from an example image. The example image may be a different image from the reference image. At block 1612, the artificial neural network recognizes the second instance of an example object from an example image. Specifically, the artificial neural network recognizes that an instance of an example object from an example image is another instance of the reference object. The recognition may be based on both the first instance and a pose in the first orbit. The second instance has the first identify and a second pose. That is, the example object may be a same type of car as the reference object or in the same class as the reference object. Furthermore, a pose of the example object may be the same as or different from the pose of the reference object.

At block 1614, the artificial neural network recognizes the second pose and the first identity of the example object based on comparing the first orbit with a second orbit of the example object. That is, the artificial neural network generates the second orbit of the example object and compares features of poses in the second orbit to poses of features in the first orbit. Based on the comparison, the identity and pose of the example object may be recognized. After recognizing the identity and pose of the example object, the artificial neural network may control an autonomous vehicle to avoid a collision with the example object. In another example, the artificial neural network may track a suspect based on the recognized identity and pose.

In some aspects, method 1600 may be performed by the SOC 100 (FIG. 1). That is, each of the elements of method 1600 may, for example, but without limitation, be performed by the SOC 100 or one or more processors (e.g., CPU 102) and/or other included components.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A method of one shot joint instance and pose recognition in an artificial neural network, comprising:
   receiving a first instance of a reference object from a reference image, the reference object having a first identity and a first pose in the first instance;
   generating a first orbit of the reference object comprising a first plurality of additional poses including a second pose for the reference object;
   recognizing a second instance of an example object from an example image, the example object having the first identity and the second pose in the second instance;
   generating a second orbit of the example object based on the recognized second instance of the example object from the example image, the second orbit comprising a second plurality of additional poses including the second pose; and
   recognizing the second pose and the first identity of the example object based on comparing the first orbit with the second orbit of the example object.

2. The method of claim 1, further comprising:
   generating the first orbit based only on the first instance using a generator learned from other objects of a same class as the reference object; and
   recognizing the second instance based on both the first instance and the first orbit.

3. The method of claim 1, further comprising training a generator to generate a third orbit at a first training stage using a two-branch encoder-decoder architecture that receives at least two of a synthetic image, a real image, or a combination thereof, of a same or different object(s).

4. The method of claim 3, further comprising training the generator to generate the third orbit at a second training stage using a multi-branch encoder-decoder architecture that receives the at least two of the synthetic image, the real image, or the combination thereof.

5. The method of claim 4, in which:
   the multi-branch encoder-decoder architecture is based on the two-branch encoder-decoder architecture and a duplicated encoder of the two-branch encoder-decoder architecture; and
   the duplicated encoder receives the real image.

6. The method of claim 3, in which the at least two of the synthetic image, the real image, or the combination thereof, have a different pose or a same pose.

7. The method of claim 3, further comprising training the generator with constraints over elements of the third orbit.

8. The method of claim 7, further comprising minimizing a loss between two poses generated with the constraints.

9. The method of claim 1, further comprising receiving the second instance of the example object from the example image.

10. An apparatus for one shot joint instance and pose recognition in an artificial neural network, the apparatus comprising:
    a memory; and
    at least one processor coupled to the memory, the at least one processor configured:
       to receive a first instance of a reference object from a reference image, the reference object having a first identity and a first pose in the first instance;
       to generate a first orbit of the reference object comprising a first plurality of additional poses including a second pose for the reference object;
       to recognize a second instance of an example object from an example image, the example object having the first identity and the second pose in the second instance;
       to generate a second orbit of the example object based on the recognized second instance of the example object from the example image, the second orbit comprising a second plurality of additional poses including the second pose; and
       to recognize the second pose and the first identity of the example object based on comparing the first orbit with the second orbit of the example object.

11. The apparatus of claim 10, in which the at least one processor is further configured:
    to generate the first orbit based only on the first instance using a generator learned from other objects of a same class as the reference object; and
    to recognize the second instance based on both the first instance and the first orbit.

12. The apparatus of claim 10, in which the at least one processor is further configured to train a generator to generate a third orbit at a first training stage using a two-branch encoder-decoder architecture that receives at least two of a synthetic image, a real image, or a combination thereof, of a same or different object(s).

13. The apparatus of claim 12, in which the at least one processor is further configured to train the generator to generate the third orbit at a second training stage using a multi-branch encoder-decoder architecture that receives the at least two of the synthetic image, the real image, or the combination thereof.

14. The apparatus of claim 13, in which:
    the multi-branch encoder-decoder architecture is based on the two-branch encoder-decoder architecture and a duplicated encoder of the two-branch encoder-decoder architecture; and
    the duplicated encoder receives the real image.

15. The apparatus of claim 12, in which the at least two of the synthetic image, the real image, or the combination thereof, have a different pose or a same pose.

16. The apparatus of claim 12, in which the at least one processor is further configured to train the generator with constraints over elements of the third orbit.

17. The apparatus of claim 16, in which the at least one processor is further configured to minimize a loss between two poses generated with the constraints.

18. The apparatus of claim 10, in which the at least one processor is further configured to receive the second instance of the example object from the example image.

19. A non-transitory computer-readable medium having program code recorded thereon for one shot joint instance and pose recognition in an artificial neural network, the program code executed by a processor and comprising:
    program code to receive a first instance of a reference object from a reference image, the reference object having a first identity and a first pose in the first instance;
    program code to generate a first orbit of the reference object comprising a first plurality of additional poses including a second pose for the reference object;
    program code to recognize a second instance of an example object from an example image, the example object having the first identity and the second pose in the second instance;

program code to generate a second orbit of the example object based on the recognized second instance of the example object from the example image, the second orbit comprising a second plurality of additional poses including the second pose; and program code to recognize the second pose and the first identity of the example object based on comparing the first orbit with the second orbit of the example object.

20. The non-transitory computer-readable medium of claim 19, in which the program code further comprises:
program code to generate the first orbit based only on the first instance using a generator learned from other objects of a same class as the reference object; and
program code to recognize the second instance based on both the first instance and the first orbit.

21. The non-transitory computer-readable medium of claim 19, in which the program code further comprises program code to train a generator to generate a third orbit at a first training stage using a two-branch encoder-decoder architecture that receives at least two of a synthetic image, a real image, or a combination thereof, of a same or different object(s).

22. The non-transitory computer-readable medium of claim 21, in which the program code further comprises program code to train the generator to generate the third orbit at a second training stage using a multi-branch encoder-decoder architecture that receives the at least two of the synthetic image, the real image, or the combination thereof.

23. The non-transitory computer-readable medium of claim 22, in which:
the multi-branch encoder-decoder architecture is based on the two-branch encoder-decoder architecture and a duplicated encoder of the two-branch encoder-decoder architecture; and
the duplicated encoder receives the real image.

24. The non-transitory computer-readable medium of claim 21, in which the at least two of the synthetic image, the real image, or the combination thereof, have a different pose or a same pose.

25. The non-transitory computer-readable medium of claim 21, in which the program code further comprises program code to train the generator with constraints over elements of the third orbit.

26. The non-transitory computer-readable medium of claim 25, in which the program code further comprises program code to minimize a loss between two poses generated with the constraints.

27. The non-transitory computer-readable medium of claim 19, in which the program code further comprises program code to receive the second instance of the example object from the example image.

28. An apparatus for one shot joint instance and pose recognition in an artificial neural network, the apparatus comprising:
means for receiving a first instance of a reference object from a reference image, the reference object having a first identity and a first pose in the first instance;
means for generating a first orbit of the reference object comprising a first plurality of additional poses including a second pose for the reference object;
means for recognizing a second instance of an example object from an example image, the example object having the first identity and the second pose in the second instance;
means for generating a second orbit of the example object based on the recognized second instance of the example object from the example image, the second orbit comprising a second plurality of additional poses including the second pose; and
means for recognizing the second pose and the first identity of the example object based on comparing the first orbit with the second orbit of the example object.

29. The apparatus of claim 28, further comprising:
means for generating the first orbit based only on the first instance using a generator learned from other objects of a same class as the reference object; and
means for recognizing the second instance based on both the first instance and the first orbit.

30. The apparatus of claim 28, further comprising means for training a generator to generate a third orbit at a first training stage using a two-branch encoder-decoder architecture that receives at least two of a synthetic image, a real image, or a combination thereof, of a same or different object(s).

* * * * *